United States Patent
Kumar et al.

(10) Patent No.: US 11,106,683 B2
(45) Date of Patent: Aug. 31, 2021

(54) SYSTEM ARCHITECTURE FOR INTERACTIVE QUERY PROCESSING

(71) Applicant: Accenture Global Solutions Limited, Dublin (IE)

(72) Inventors: Shiv Kumar, Bangalore (IN); Ranjana Bhalchandra Narawane, Mumbai (IN); Vinay Avinash Dorie, Bangalore (IN); Suchit Vishnupant Bhatwadekar, Pune (IN)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 216 days.

(21) Appl. No.: 16/050,259

(22) Filed: Jul. 31, 2018

(65) Prior Publication Data
US 2019/0065556 A1   Feb. 28, 2019

(30) Foreign Application Priority Data
Aug. 25, 2017 (IN) .............................. 201741030157

(51) Int. Cl.
*G06F 16/00* (2019.01)
*G06F 16/2457* (2019.01)
*G06F 16/332* (2019.01)
*G06F 16/9032* (2019.01)
*G06F 9/451* (2018.01)
*G06F 16/242* (2019.01)
*G06F 16/9537* (2019.01)
(Continued)

(52) U.S. Cl.
CPC ........ *G06F 16/24575* (2019.01); *G06F 9/451* (2018.02); *G06F 16/2428* (2019.01); *G06F 16/3329* (2019.01); *G06F 16/90332* (2019.01); *G06F 16/9537* (2019.01); *G06N 5/02* (2013.01); *G06Q 30/0613* (2013.01)

(58) Field of Classification Search
None
See application file for complete search history.

(56) References Cited

U.S. PATENT DOCUMENTS 6,766,320 B1 * 7/2004 Wang ................... G06F 16/313
8,909,616 B2 * 12/2014 Rosenoff .............. G06F 16/951
707/708
9,165,028 B1 * 10/2015 Christensen ........ G06F 16/3338
(Continued)

OTHER PUBLICATIONS

Office Action issued on European application 18188356.2 dated Jun. 10, 2020, 8 pages.
(Continued)

*Primary Examiner* — Bai D Vu
(74) *Attorney, Agent, or Firm* — Crowell & Moring LLP

(57) ABSTRACT

An interactive query processing system provides a user interface, including a "chat bot," capable of receiving natural language queries from users, processing those queries to determine intents and entities, extracting data from applications and portals, synthesizing the data, and displaying the data to the user via the user interface in a useful, easy to understand, and unified format. The user utilizes a singular UI to receive data responsive to queries rapidly instead of manually extracting and synthesizing data from multiple different portals or dashboards. Additionally, the system provides actionable insights without requiring a user to sort or analyze data from multiple sources.

20 Claims, 26 Drawing Sheets

(51) Int. Cl.
G06N 5/02 (2006.01)
G06Q 30/06 (2012.01)

(56) References Cited

U.S. PATENT DOCUMENTS

| | | | |
|---|---|---|---|
| 2003/0149704 A1* | 8/2003 | Yayoi | G06F 16/3326 |
| 2005/0010553 A1* | 1/2005 | Liu | G06F 16/583 |
| 2006/0004710 A1* | 1/2006 | Borthakur | G06F 16/24524 |
| 2009/0049032 A1* | 2/2009 | Maghoul | G06F 16/9537 |
| 2009/0319512 A1* | 12/2009 | Baker | G06F 16/00 |
| 2012/0117112 A1* | 5/2012 | Johnston | G06F 16/9537 |
| | | | 707/771 |
| 2013/0246383 A1* | 9/2013 | White | G06F 16/9535 |
| | | | 707/706 |
| 2014/0280044 A1* | 9/2014 | Huynh | G06F 16/24578 |
| | | | 707/722 |
| 2017/0213126 A1 | 7/2017 | Hammond et al. | |
| 2017/0228367 A1 | 8/2017 | Pasupalak et al. | |
| 2017/0249309 A1* | 8/2017 | Sarikaya | G06F 40/35 |
| 2018/0189348 A1* | 7/2018 | Sirohi | G06F 16/24539 |

OTHER PUBLICATIONS

First Examination Report of Indian Application No. 201741030157 dated Oct. 6, 2020, 8 pages.

\* cited by examiner

Sage

Apple Computers
NASDAQ.APPL -FEB 6, 2017
$132.12 ↓ -0.33

$4.2M
Amount Booked
$6.0M   30%
FY16    YTD

$3.2M
Amount Expected
$1.8M   $1.4M
Upside  Commit

$8.7M
Current Potential
$3.4M   $5.3M
IB      Leads

Actionable Insight
- Refresh opportunity of $3.2M identified at Apple Computers
- $4M Qualified leads available for conversion
- ● Apple Computers TAC Health Score is Red. Do you want to know more? Yes

Was this information helpful?   👍 Yes | 👎 No

Katherine Dewitt
Account Manager, Sal...

● TAC Health
○ Marketing Engagement
○ CSAT $10M
$5M
$0M
      2016   2015   2014
Last 3 Years Booking by BE 2014
☒ Networking  $5.5M
— 1402

[ Get More ]

Type a message here..

SYSTEM ARCHITECTURE FOR INTERACTIVE QUERY PROCESSING

CROSS-REFERENCE TO RELATED APPLICATIONS

This application claims the benefit of India Application No. 201741030157, filed in the Indian Patent Office on Aug. 25, 2017, and titled "System Architecture for Interactive Query Processing," the contents of each of which are incorporated herein by reference in their entirety.

TECHNICAL FIELD

This disclosure relates to machines and complex system architectures that process queries using natural language processing, access one or more applications in relation to the query, and return information responsive to the query.

BACKGROUND

Users and consumers of data are often required to access multiple various sources of data spanning across myriad different applications or platforms in order to retrieve all data required for a particular query. Further, these users also must access these various applications or platforms, or other applications and platforms, to retrieve comprehensive datasets in order to form valuable insights, which insights might otherwise be hidden or undiscovered unless specifically sought.

For example, in a sales context, particularly within the quote-to-cash lifecycle of a transaction, a sales agent may require data or reports from various source applications or platforms. Typically, the agent will require information from multiple different source applications or platforms to answer a single question or query that the agent or their customer may have regarding the quote-to-cash process. This can be a time-intensive process, requiring the agent to know how to access each of the underlying applications separately and know how to synthesize the received data to develop suitable responses to their queries.

Moreover, repeated querying and transmission of raw data or large reports from multiple applications or platforms to the user greatly increases network usage as well as local and cloud-based storage (e.g., within email repositories or other databases), which unnecessary usage of local and distributed resources ultimately burdens an overall system (e.g., within a company), resulting in decreased performance, increased cost, and increased complexity.

BRIEF DESCRIPTION OF THE DRAWINGS

FIG. 14 shows another example screenshot of the dynamic graphical user interface as may be provided by the system to provide an overview of an account.

FIG. 16 shows another example screenshot of the dynamic graphical user interface as may be provided by the system to provide details regarding an account.

FIG. 22 shows another example screenshot of the dynamic graphical user interface as may be provided by the system to expedite an order.

FIG. 26 shows another example screenshot of the dynamic graphical user interface as may be provided by the system to receive feedback on a previous query and corresponding response.

DETAILED DESCRIPTION

Figure 1:
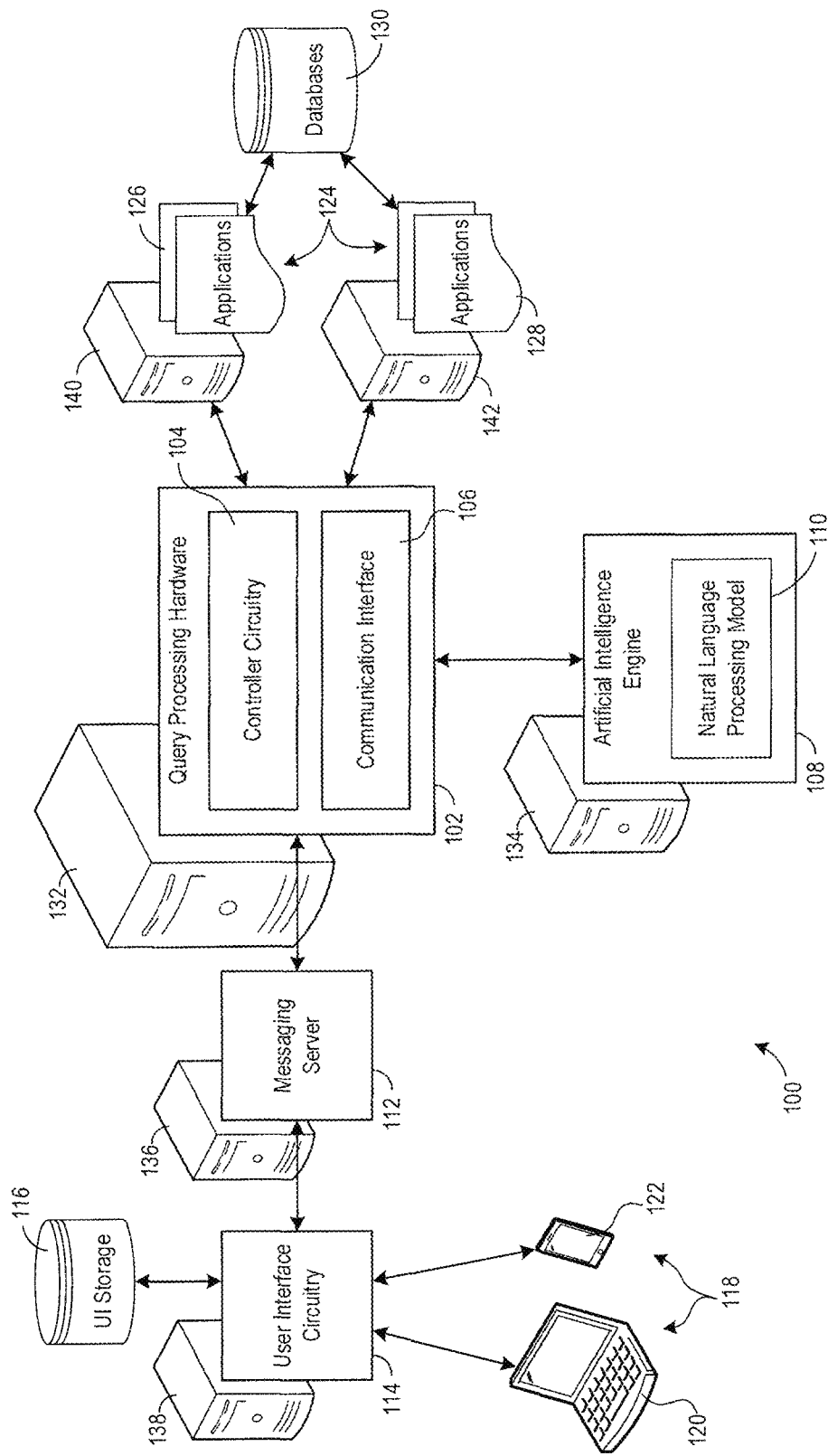
FIG. 1 shows an example system configuration and context for implementing an interactive query processing system.

The present disclosure provides a system architecture and corresponding methods to provide an interactive query processing system 100. The interactive query processing system 100 (or "system 100") provides a singular user interface and corresponding "chat bot" to provide interactive responses to queries or questions. In a sales context, the system 100 may provide interactive responses to queries or questions a sales agent may have regarding a quote or an order.

This may help the agent in the process of creating a quote and determining a status or a quote or order. Further, because the interactive query processing system 100 is capable of deriving actionable insights from past and current transactions for an account, the system 100 can suggest and provide those insights to the agent without requiring the agent to sift through and synthesize large amounts of data or reports. In this sales context, these actionable insights may include, for example, identification of cross-selling opportunities, upselling opportunities, whitespace opportunities, product recommendations, and key contacts for the account.

Further, the interactive query processing system 100, or more specifically, the query processing hardware 102 and its controller circuitry 104, are platform agnostic. That is, the system 100 is capable of operating with different artificial intelligence (AI) engines from different AI service providers. Further, the system 100 is capable of operating with different user interface platforms and providers such that, for example, different user interface versions can be provided to users (e.g., a desktop or a mobile version).

From the user's perspective, the system 100 is agnostic with respect to the underlying applications or platforms with which the system 100 communicates and from which the system 100 extracts data. That is to say, the system 100 performs all the processing required to answer queries without requiring the user to access multiple different portals or dashboards. Instead, the user utilizes a singular dynamic user interface that accepts natural language queries and provides synthesized data and reports as well as actionable insights relating to that data or to an account. This serves to free the user from the time required to access the various separate dashboards or portals. This also serves to unburden the user from requiring the technical knowhow to interact with the multiple different source applications or platforms that provide the required data and reports. Instead, the user is simply free to interact with a single interface in a natural manner, using a "chat bot" capable of receiving and processing natural language queries spanning a host of possible queries within a particular application context. The user can utilize this singular natural interface instead of adhering to the strict rubrics of the technical specifics and particular semantics required for interaction with the multiple different underlying applications or platforms, thereby enabling the agent to focus on other tasks.

The system 100 provides a technical effect of reduction in overall network traffic load and storage usage by reducing repeated querying and transmission of raw data or large reports from multiple applications or platforms to the user. Instead, a curated set of data is provided specifically tailored to the user's query, giving the user only what they require or what they request. In this regard, performance of an overall system or network is improved, costs are reduced, and complexity is decreased.

FIG. 1 illustrates an example system configuration and context for implementing an interactive query processing system 100. The interactive query processing system 100 may include query processing hardware 102, which may further include controller circuitry 104 and communication interface circuitry 106. The system 100 also may include or be in communication with an artificial intelligence (AI) engine circuitry 108, which includes a natural language processing model 110 with which the AI engine circuitry 108 processes received queries. The query processing hardware 102, and particularly the communication interface circuitry 106, communicates with the AI engine circuitry 108 either directly within a networked environment (such as on similarly located server devices), or communicates with the AI engine circuitry 108 remotely, such as via a service provided by the AI engine circuitry 108, for example, using an application programming interface (API).

The system 100 also may include or be in communication with a messaging server 112 and user interface circuitry 114. For example, the communication interface circuitry 106 of the query processing hardware 102 may be coupled to or otherwise in communication with the messaging server 112, the user interface circuitry 114, and the user devices 118. The messaging server 112 handles messaging between the query processing hardware 102 and other elements, such as the user interface circuitry 114. The messaging server 112 also handles registration and authentication of users. The user interface circuitry 114 may include or be connected to a user interface (UI) storage 116, which may store logic, instructions, code, images, or other content necessary to generate and provide a dynamic interactive graphical user interface (GUI). The user interface circuitry 114 is connected to user devices 118, which may include, for example, a laptop or desktop computer 120 or a mobile device 122. The user devices 118 may include, for example, a computer (e.g., laptop) 120, a smartphone 122, or another electronic device capable of communicating with user interface circuitry 114 via a network or directly. The user devices 118 may be computing devices which allow a user to connect to a network through one or more known network types utilizing one or more known networking protocols (e.g., via wired or wireless Internet employing TCP/IP, LTE, or 4G). Examples of a user devices 118 include, but are not limited to, a personal computer, personal digital assistant ("PDA"), a laptop, a smartphone, a cellular phone, a tablet, or another electronic device. The user devices 118 may include a keyboard, keypad, a touch screen interface, or a cursor control device, such as a mouse, or a joystick, a remote control, and/or any other device operative to view and interact with a user interface. The user devices 118 include a display device capable of displaying a graphical user interface (GUI) provided by the user interface circuitry 114 over the network. In one embodiment, the user devices 118 are configured to request and receive information from the networks, for example, using a web browser, such as INTERNET EXPLORER® (sold by Microsoft Corp., Redmond, Wash.) or FIREFOX® (provided by Mozilla). So configured, a user is capable of interfacing with the interactive query processing system 100 via a user device 118 to enter queries to the system 100 and receive information related to the queries.

On a backend, the system 100 also includes or is in communication with a plurality of applications 124, for example, including a first application 126 and a second application 128. The communication interface circuitry 106 of the query processing hardware 102 may be coupled to or otherwise in communication with the applications 124. The applications 124 may each include or have access to one or more databases 130, which databases 130 may be proprietary to a particular application 124, or may be shared amongst applications 124. The information in the databases 130 may belong to the owner of the system 100 or a client that utilizes the system 100. Alternatively or additionally, the information in the databases 130 may belong to third party database services (such as subscription databases or other informational database services). The databases 130 store information relative to the overall purpose of the system 100. For example, if the system 100 is utilized in a sales context, the databases 130 may include information on sales accounts, transactions, quotes, orders, technical cases, or other data relative to multiple different customer accounts. Further, the databases 130 may include information on sales agent performance, including goals, commission attainment, and other such information.

Some or all of the components of the interactive query processing system 100 may be implemented on a single computing device, a single server, or a set of networked servers, such as server 132. Alternatively, the interactive query processing system 100 may include many different computing systems or servers operating in a distributed computing environment. Each server 132-142 may represent a different distributed computing service (e.g., in the "cloud") that performs particular tasks or portions of the overall functionality of the interactive query processing system 100. The multiple different servers 132-142 may communicate with each other over the Internet or other networks, and may utilize multiple different application programming interfaces (API) to intercommunicate and exchange data and instructions.

For example, the query processing hardware 102 may be implemented in a query processing server 132. The query processing server 132 may provide or implement a localized or a cloud-based service to perform the control functions discussed herein. In certain examples, the query processing server 132 is implemented in Google Cloud Platform™, Microsoft Azur™, Amazon Web Services™, or another cloud-based processing system. The AI engine circuitry 108 may be implemented in an AI engine server 134. In certain embodiments, the AI engine circuitry 108 is also implemented in a cloud-based service, such as with IBM Watson™, or another cloud based processing system that can implement a natural language processing model, such as Microsoft Oxford™ or Google DeepMind™. The messaging server 112 may be implemented in a messaging framework server 136 and may be provided by a back-end service provider such as, for example, Firebase™ or other such services that provide messaging support. The user interface circuitry 114 may be implemented in a user interface server 138. In certain embodiments, the user interface server 138, which may also be implemented in a cloud-based service or other hosted service, and may implement code using AngularJS, ReactJS, Ember.JS, or another language capable of providing a dynamic user interface. The applications 124 may be implemented on application servers 140 and 142 (or others). For example, the first application 126 may be implemented in first application server 140 and the second application 128 may be implemented in second application server 142. These application servers 140 and 142 may be provided by the developers, providers, or hosts of the applications 124, such as, for example Salesforce®. Alternatively, the application servers 140 and 142 may be collocated with or co-owned by the same entity that owns any of the other servers 132-142. The application servers 140 and 142 may communicate with the databases 130 to extract and analyze data according to their programming. In one example, the databases 130 may maintain raw data within a Hadoop framework. Files and data may be communicated between the databases 130 and the applications 124, and/or the applications 124 and the query processing hardware 102 using JSON files or a similar file structure. The query processing hardware 102 acts as an integration hub to integrate the functions of the system 100 and synthesize the received data. The query processing hardware 102 also acts as a location service, an identity manager, and a notification service. So configured, an interactive query processing system 100 is provided to enable user devices 118 to send queries and receive information responsive to those queries, as is discussed in more detail below.

Figure 2:
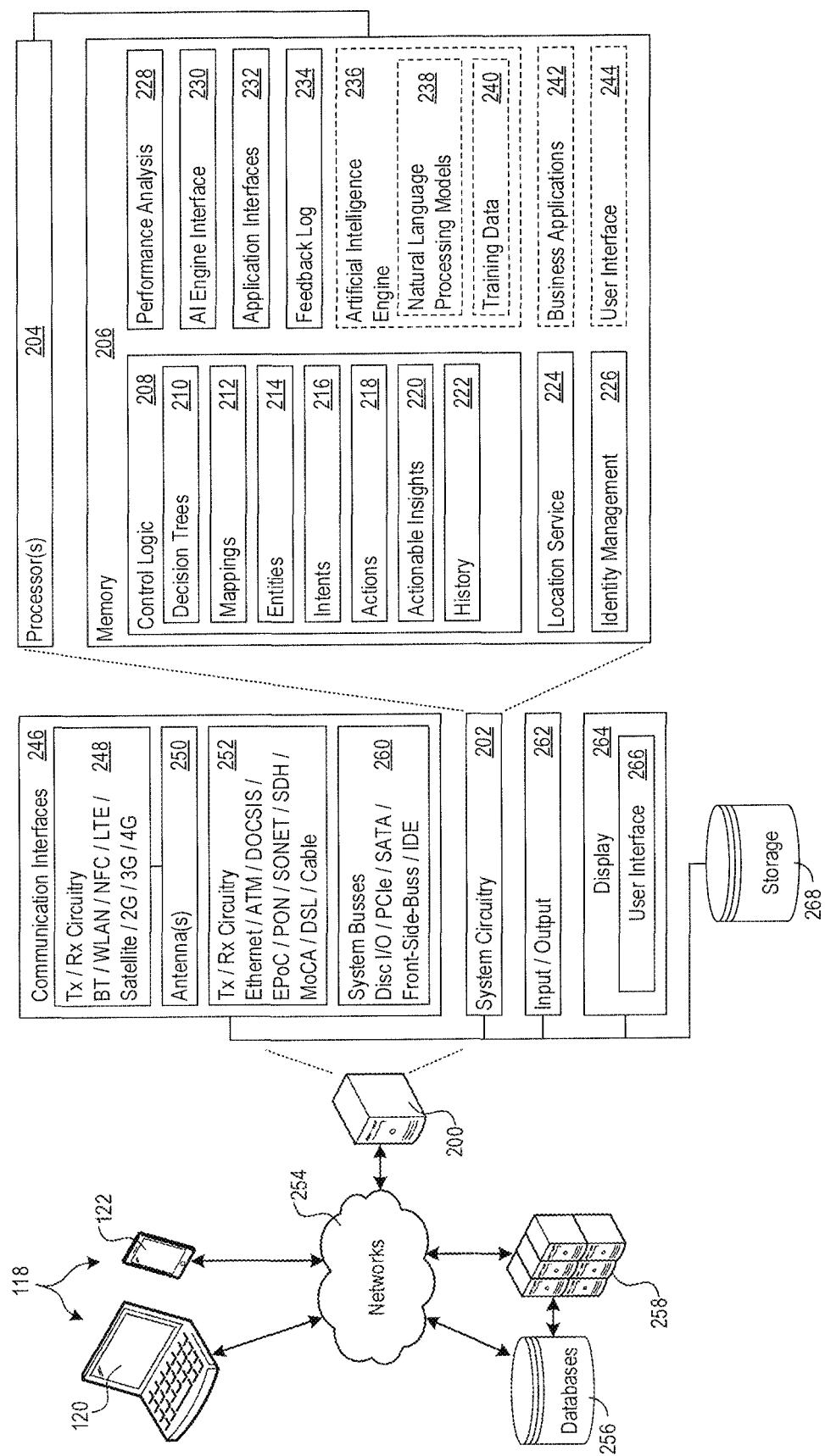
FIG. 2 shows an example system implementation for the interactive query processing system.

FIG. 2 shows an example of a specific system implementation for all or parts of the system architecture described above for the interactive query processing system 100. In the example in FIG. 2, all or part of the interactive query processing system 100 is implemented in the machine 200. For example, the machine 200 may correspond to query processing server 132. Additionally, the machine 200 may also correspond to any or all of the other servers 134-142 discussed above. The machine may represent a single server device, or, more appropriately, may represent a plurality of server devices that work together to implement the interactive query processing system 100.

According to the system implementation, the machine 200 includes system circuitry 202 to support implementation of the various aspects and functionality discussed above with respect to the high-level system diagram in FIG. 1, and below with respect to the example flow diagrams of logic in FIGS. 3-11, the example interactive conversation flow in FIG. 12, and the example screenshots of the dynamic graphical user interface in FIGS. 13-26. In one embodiment, the system circuitry 202 includes processors 204, memory 206, and/or other circuitry. The processors 204 may be connected to the memory 206 and may comprise a memory system including a plurality of memory devices collocated or distributed across multiple systems. The memory 206 may store control instructions, operational parameters for the control instructions, datasets, and other information. The control instructions may be executed by the processor 204 to implement any of the processing described herein, according to configurations set by the operational parameters. Further, in some embodiments, various circuitry elements of the machine 200 may be implemented by the system circuitry 202, for example, as a processor 204 and corresponding sets of instructions that control the operations of the processor.

The memory 206 may store data and instructions for use by the circuitry elements or servers to implement portions of the circuitry elements. The memory 206 includes control logic 208 that provide the logic and rules for operation of the interactive query processing system 100, and more specifically, the controller circuitry 104 of the query processing hardware 102. The control logic 208 may include many subparts, including one or more decision trees 210 or other logical flow control frameworks (e.g., a state machine) that provide pre-programmed actions that are performed by the controller circuitry 104 responsive to received inputs and a current state or a current location within the decision tree. The control logic 208 may also include a plurality of mappings 212 that map received inputs, such as specific intents or entities received as inputs, to particular applications and/or particular queries for applications.

The control logic 208 may also include a listing of entities 214 representing entities that the query processing hardware 102 may possibly receive from the AI engine circuitry 108. The entities may be, for example, people, places, things, times, or aspects. In a sales context, the entities may include sales accounts of a sales organization, account managers or sales agents within that sales organization, timeframes with which a query is concerned, or other aspects of a query. The control logic 208 may also include a listing of intents 216 representing intents that the query processing hardware 102 may receive from the AI engine circuitry 108. These intents 216 correspond to a parsed intent or purpose of a query as may be determined by the AI engine circuitry 108. The entities 214 and intents 216 stored within the control logic 208 together represent a list of vocabulary that the query processing hardware 102 may possibly receive from the AI engine circuitry 108. The control logic 208 may also include a set of actions 218 that may be executed by the query processing hardware 102 to process queries and provide information responsive to those queries. For example, the actions 218 may include particular queries that may be communicated to various applications 124 to receive information related to the initial query. Further, the actions 218 may include processing instructions defining how to receive, analyze, and/or parse any received information from the applications 124. There are many other possible actions within the set of actions 218, many of which are discussed below.

The control logic 208 may also include a set of actionable insights 220, which are instructions to control the query processing hardware 102 to request and analyze data and to search for insights into that data. For example, the actionable insights 220 may include instructions that cause the query processing hardware 102 to search for interesting or extraordinary data or trends that may be useful or of interest to a user. The control logic 208 may also include a history 222 of previous queries, query responses, current states, and/or past states, which the query processing hardware 102 may utilize in determining a context of a query, a current or previous location within a decision tree or state machine, or a feedback response relating to how pertinent a previous query response was. The query processing hardware 102, and more specifically the controller circuitry 104, uses the control logic 208, and more specifically the entities 214 and intents 216, together with the mappings 212 and the decision trees 210, to determine an action within the set of actions 218 that is to be taken by the query processing hardware 102 to control operations of at least portions of the interactive query processing system 100 as a whole.

The memory 206 may also include location service instructions and data 224, which may control the query processing hardware 102 to utilize location data received from the user device 118 to determine a geographical location of the user device 118 and corresponding geographically relevant contextual information, such as nearby accounts or points of interest. The location service instructions and data 224 may also include and/or utilize the locations of the nearby accounts or points of interest. The memory 206 may also include identity management instructions and data 226, which may identify a user (e.g., a sales agent or account manager) and maintain the account or profile information for that user. For example, in a sales context, the identity management instructions and data 226 may include a list of sales accounts associated with a particular sales agent.

The memory 206 may also include performance analysis instructions and data 228, which may control the query processing hardware 102 to extract and analyze data relating to the performance of a particular user. For example, in a sales context, performance analysis instructions and data 228 may cause the query processing hardware to determine goal attainment, commissions, and/or forecasts for a sales agent.

The memory 206 may also include AI engine interface instructions 230, which may control the controller circuitry 104 and/or the communication interface circuitry 106 to interact with the AI engine circuitry 108, for example, according to an API provided by the AI engine circuitry 108.

Similarly, the memory 206 may also include application interface instructions 232, which may control the controller circuitry 104 and/or the communication interface circuitry 106 to interact with the applications 124, for example, according to APIs provided by the applications 124.

The memory 206 may also include a feedback log 234, which may store feedback received from user devices 118 regarding performance of the interactive query processing system 100. The feedback stored within the feedback log 234 may be utilized by the AI engine circuitry 108 to train and improve the natural language processing model 110 as well as other aspects of the system 100.

Optionally, the memory 206 may include AI engine instructions and data 236, which causes the system circuitry 202 to perform the actions of the AI engine circuitry 108 discussed herein. The AI engine instructions and data 236 may further include natural language processing model 238 and training data 240 used to train the natural language processing model 238. Alternatively, the AI engine instructions and data 236 may be stored in a separate server, such as AI engine server 134, which may be provided as a service by a separate entity.

Additionally, the memory 206 may include business applications instructions and data 242, which may cause the system circuitry 202 to perform the actions of the applications 124 discussed elsewhere herein. Alternatively, the business applications instructions and data 242 may be stored in a separate server, such as application servers 140 and 142, which may be provided as services by separate entities.

The memory 206 may also include user interface instructions and data 244, which may cause the system circuitry 202 to provide the dynamic user interface discussed herein. Alternatively, the user interface instructions and data 244 may be stored in a separate server, such as user interface server 138 or user interface storage 116.

The machine 200 may also include communication interfaces 246, which may support wireless communication via wireless communication circuitry 248 and antennas 250. Example wireless communication protocols may include Bluetooth, Wi-Fi, WLAN, near field communication protocols, cellular protocols (2G, 3G, 4G, LTE/A), and/or other wireless protocols. Also, communication interface 246 may include wired communication circuitry 252. Example wired communication protocols may include Ethernet, Gigabit Ethernet, asynchronous transfer mode protocols, passive and synchronous optical networking protocols, Data Over Cable Service Interface Specification (DOCSIS) protocols, EPOC protocols, synchronous digital hierarchy (SDH) protocols, Multimedia over coax alliance (MoCA) protocols, digital subscriber line (DSL) protocols, cable communication protocols, and/or other networks and network protocols. The communication interfaces 246 may be connected or configured to connect to the networks 254, including the Internet or an intranet, to enable the machine 200 and the system circuitry 202 therein to communicate with other systems and devices including, for example, the user devices 118, remote databases 256 (e.g., databases 130), or other remote servers 258 (e.g., servers 134-142). Additionally, the communication interface 246 includes system busses 260 to effect intercommunication between various elements, components, and circuitry portions of the machine 200. Example system bus implementations include PCIe, SATA, and IDE based buses.

The communication interfaces 246 may enable interconnection of various circuitry components within the machine 200 (e.g., via one or more buses, computer component interfaces, or peripheral component interfaces). For example, the communication interfaces 246 may couple to circuitry elements and databases internally via system busses 260 if internally maintained, or externally via the wireless communication circuitry 248 or the wired communication circuitry 252 if externally maintained. The communication interfaces 246 may also support communication with the remote databases 256, the user devices 118, or other remote servers 258.

The communication interfaces 246 may support communication with the user devices 118, either directly or through one or more other servers (e.g., user interface server 138. Communication with the user devices 118 may be effected through user interface circuitry 114 and/or with user interface instructions and data 244. A dynamic interactive graphical user interface may be provided to the user devices 118 via the networks 254 to enable interaction between the user devices 118 and the machine 200. In one example, the machine 200 (e.g., if representative of the user interface server 138) comprises a web server capable of providing web services or web pages to the user devices 118. For example, the user device 118 may log into the web server and receive pages corresponding to the dynamic interactive graphical user interface.

Alternatively, the machine 200 may be a computing device such as a laptop or a personal computer that includes the circuitry and programming necessary to implement the interactive query processing system 100 without the need to interact with a remote server. In such an approach, the machine 200 may itself include various I/O interfaces 262 and/or a display 264, for example, to enable local interaction with the various circuitry elements discussed above instead of or in addition to interaction over the networks 254 with a remote user device 118. In some examples, the display device 264 can provide a user interface 266 to a local user, which can be the same as or a variation of a user interface that can be provided to a remote user device 118.

The machine 200 may also include a storage device 268 (e.g., a hard drive, solid-state drive, or other memory system) to enable local storage of system software, user interfaces, or system instructions. The various databases and data stores discussed herein may be implemented on multiple distinct storage devices (e.g., memories or hard drives), on a single storage device. For example, some storage databases may be implemented on a common shared storage device, while other storage databases may be implemented on other distinct storage devices. These storage devices may be local to the machine 200, for example, housed within the machine 200 or directly connected to the machine (e.g., memory 206 or storage device 268). Alternatively, the databases, for example, remote databases 256, may be connected to the machine 200 over networks 254 such as an intranet (e.g., local) or via the Internet.

FIGS. 3-11 illustrate example flow diagrams of logic the system 100 may implement to interactively process queries received from a user device 118. Various circuitry elements, servers, or computing devices discussed above may be configured to implement some or all of the logic shown in FIGS. 3-11. For illustration purposes, reference is also made to the example screenshots of the dynamic graphical user interface in FIGS. 13-26 within the explanation of the logic shown in FIGS. 3-11.

Figure 3:
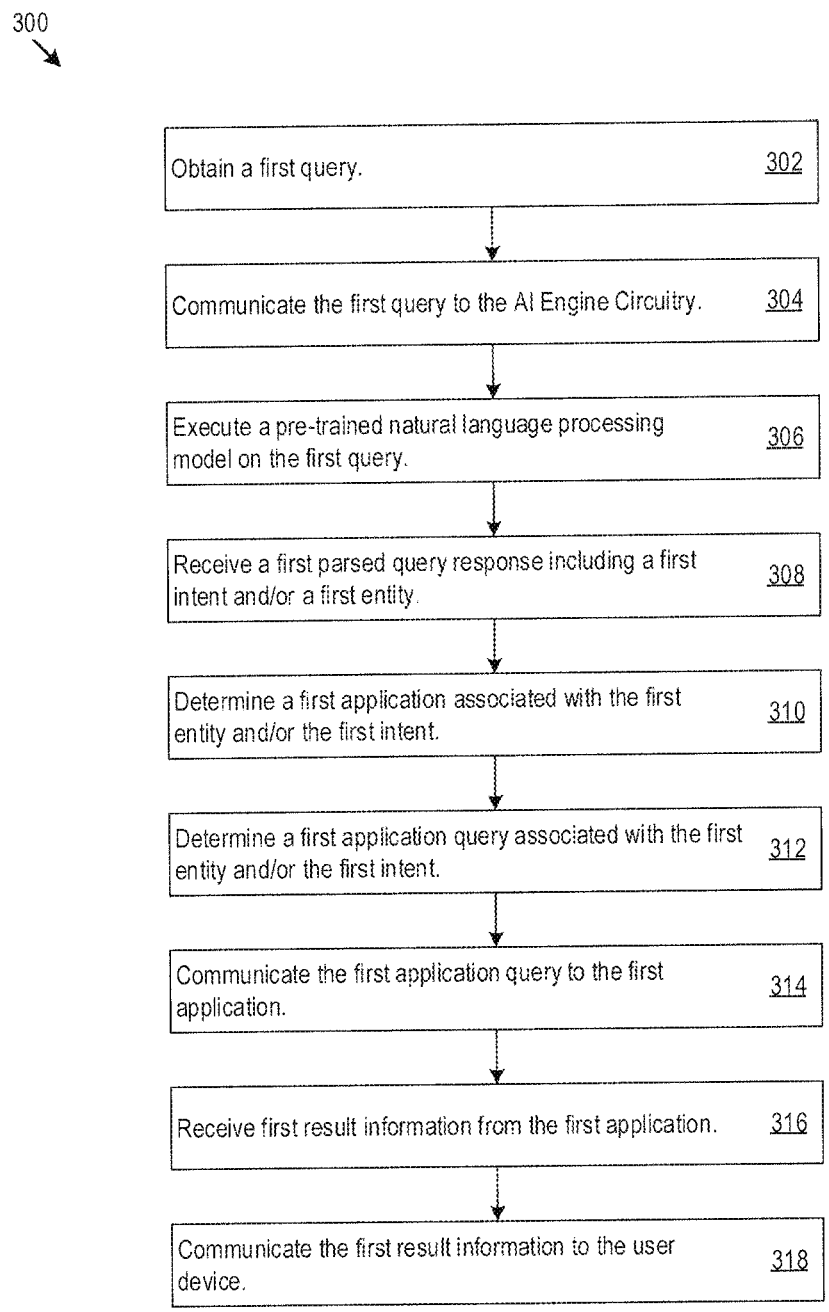
FIG. 3 shows an example flow diagram of logic that the system may implement to receive a first query and respond to the first query.

FIG. 3 shows an example flow diagram of logic 300 that the system 100 may implement to receive a first query and respond to the first query. At 302, the query processing hardware 102 obtains or receives a first query from a user device 118. More specifically, the controller circuitry 104 of the query processing hardware 102 receives the first query via the communication interface circuitry 106. The user device 118 transmits the first query to the user interface circuitry 114. The user interface circuitry 114 communicates the first query to the messaging server 112, which in turn communicates the first query to the query processing hardware 102 to be received by the communication interface circuitry 106.

Figure 13:
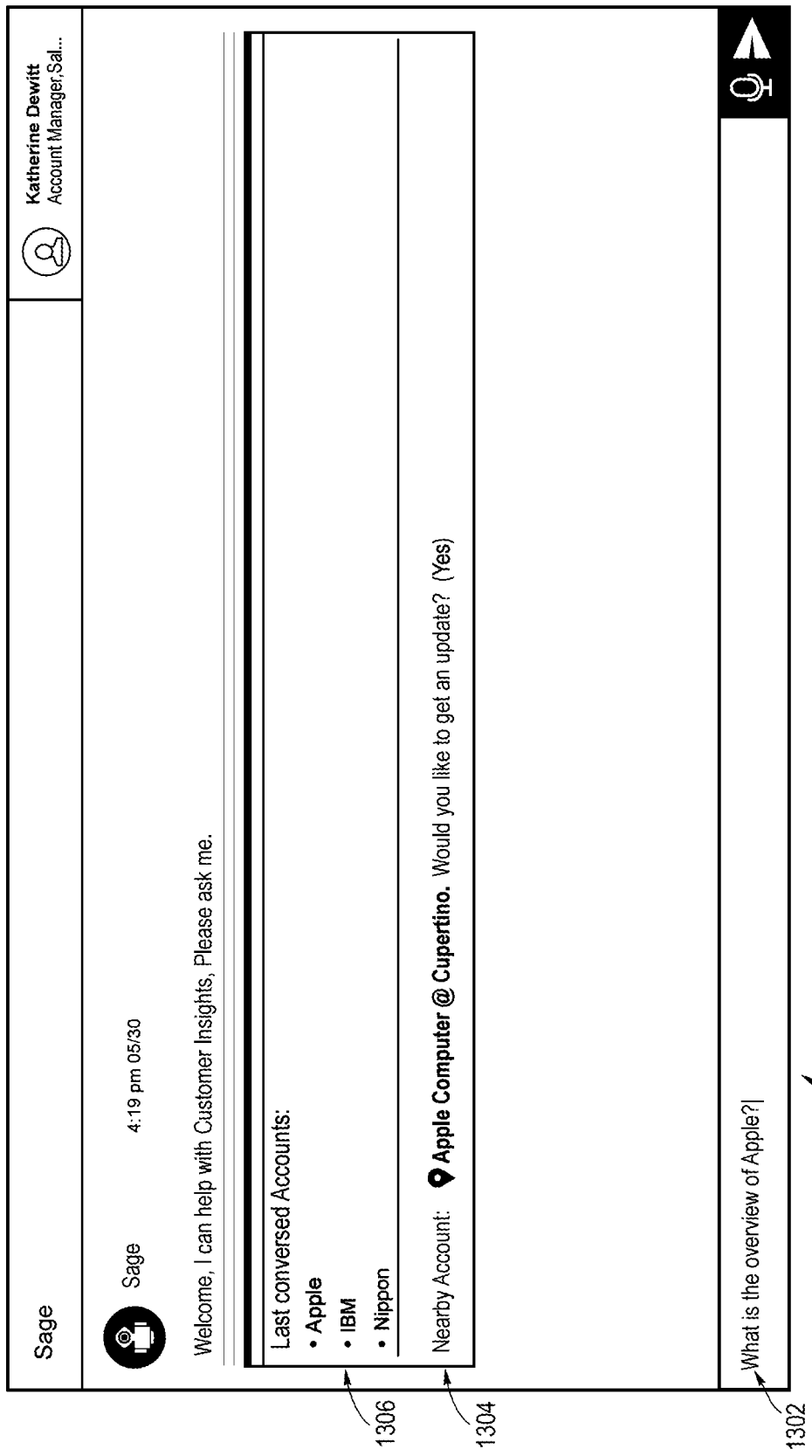
FIG. 13 shows an example screenshot of a dynamic graphical user interface as may be provided by the system to provide a geographically contextual query.

With brief reference to FIG. 13, which shows an example screenshot 1300 of the dynamic graphical user interface provided by the user interface circuitry 114, the user may type (or speak) the first query into the user device 118 within the dynamic graphical user interface (GUI) presented to the user. The GUI presents a "chat bot" or other interactive element that enables the user to enter the query or question, shown at 1302 ("What is the overview of Apple?").

Returning to FIG. 3, at 304, the controller circuitry 104 communicates the first query to the AI engine circuitry 108. At 306, the AI engine circuitry 108 executes a pre-trained natural language processing model 110 on the first query, where the pre-trained natural language processing model 110 has been pre-trained with a plurality of terminologies and a plurality of primary queries that may be specific to a particular application setting or industry in which the system 100 is used. For example, the training terminologies and primary queries may be specific to a high-tech sales setting and may include terms that may be specific to that industry. The AI engine circuitry 108 processes the first query with the pre-trained natural language processing model 110 to parse the first query into a first parsed query response including a first intent and/or a first entity. The first intent represents an intention or purpose of the first query, while the first entity represents an entity or subject within the query. Taking the example query shown in FIG. 13, an example intent may be "overview" while an example entity may be "Apple."

At 308, the query processing hardware 102 receives the first parsed query response from the AI engine circuitry 108. At 310, the query processing hardware 102 analyzes the received intent and/or entity to determine a first application associated with the intent and/or entity. At 312, the query processing hardware 102 also analyzes the received intent and/or entity to determine a first application query associated with the intent and/or entity. For example, as discussed above, the controller circuitry 104 may utilize the decision trees 210 and mappings 212 of the control logic 208 stored within the memory 206 to determine a first application (or more) of the set of applications 124 and a first application query to communicate to the first application, which are both associated with the first query. Using the example query shown in FIG. 13, the parsed intent of "overview" and the parsed entity of "Apple" may trigger the control circuitry 104 to select one or more applications 124 that can provide information useful to provide an overview of the sales account for Apple. Further, the control circuitry 104 may also select the appropriate queries to submit to the selected applications 124 to extract the information necessary to provide the requested overview of the sales account for Apple. As such, at 314, the query processing hardware 102 communicates the first application query to the first application and, at 316, receives first result information from the first application that is responsive to the first application query.

At 318, the query processing hardware 102 communicates the received first result information to the user device. This may include, for example, communicating the received first result information to the user interface circuitry 114, which user interface circuitry 114 subsequently formats the received first result information into a usable data format within the graphical user interface such that the results are easy to understand and digest. With brief reference to FIG. 14, which shows another example screenshot 1400 of the dynamic GUI provided by the user interface circuitry 114, an example of an overview for account "Apple" is illustrated. As is shown, the data is formatted into an easy to read and easy to understand format within the GUI, with key metrics and information being display prevalently and visual aids such as bar graphs provided. The example GUI provides interactive aspects that are responsive to interactions by a user. For example, as a user hovers a mouse pointer above a portion of the bar graph, additional data related to that bar graph is shown at 1402. In this example, the account overview for a customer account may show current and potential bookings, a pipeline summary, and/or renewal and refresh opportunities.

Figure 4:
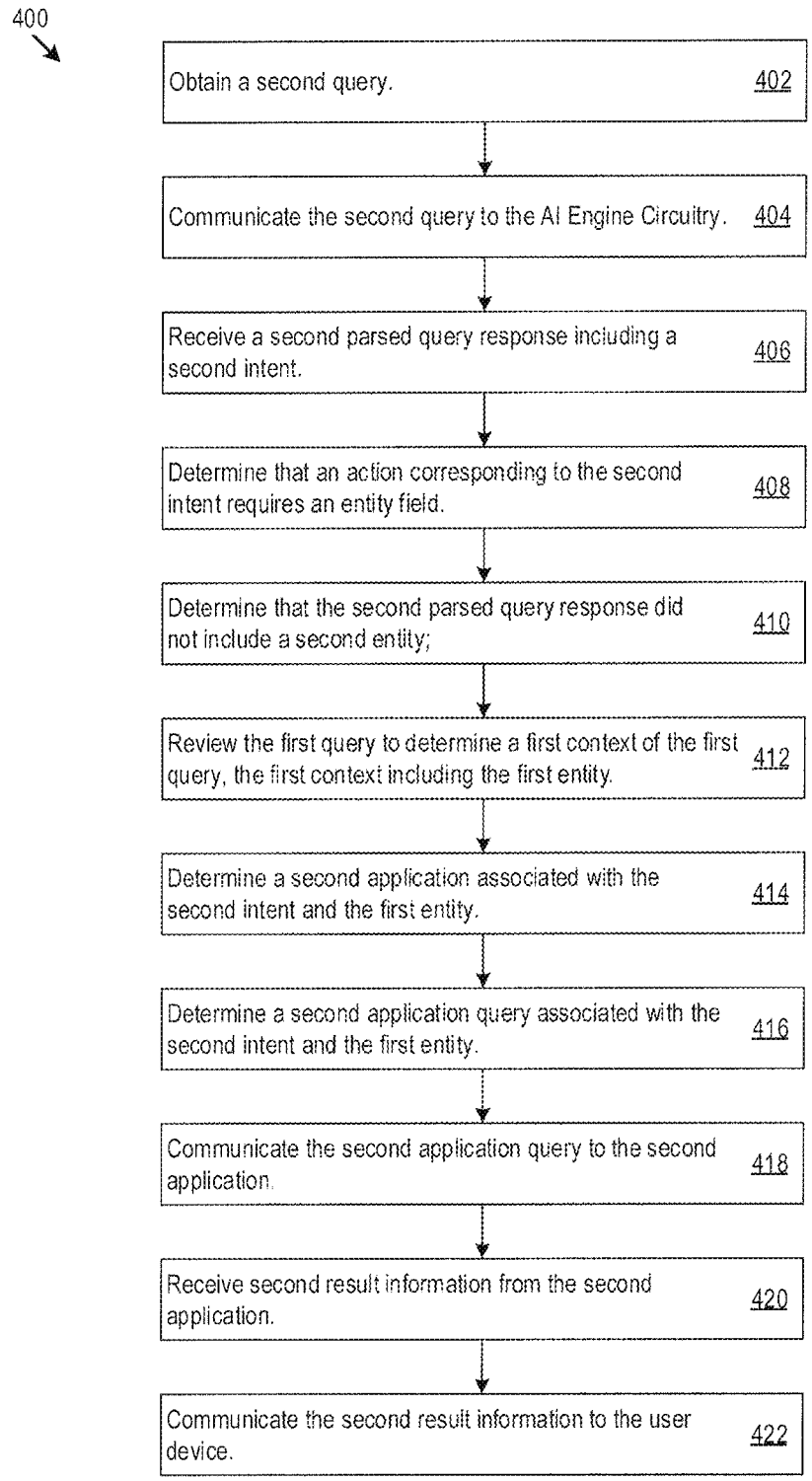
FIG. 4 shows another example flow diagram of logic that the system may implement to receive a second query and respond to the second query.

FIG. 4 shows another example flow diagram of logic 400 that the system 100 may implement to receive a second query and respond to the second query. At 402, like with step 302 discussed above, the query processing hardware 102 obtains or receives a second query from a user device 118. With brief reference to FIG. 15, which shows an example screenshot 1500 of the dynamic graphical user interface provided by the user interface circuitry 114, the user may type the second query into the GUI, shown at 1502 ("Why is the TAC red?"). Returning to FIG. 4, at 404, the controller circuitry 104 communicates the second query to the AI engine circuitry 108, which in turn processes the second query to create a second parsed query response that includes at least a second intent. Using the example query from FIG. 15, the AI engine circuitry 108 may determine that the second intent of the second query is to provide details about the TAC ("technical assistance center"). At 406, the query processing hardware 102 receives the second parsed query response including the second intent.

At 408, the query processing hardware 102 determines an action corresponding to the second intent, and determines that action requires a corresponding entity field. Using the example second query 1502 from FIG. 15, the controller circuitry 104, using the decision trees 210 and mappings 212, may determine that any action regarding "TAC details" requires the specification of an entity (e.g., a particular sales account referred to by the received intent pertaining to "TAC details"). At 410, the query processing hardware 102 determines that the second parsed query response did not include a second entity. For example, the query processing hardware 102 may review the second parsed query response to determine that the AI engine circuitry 108 sent only an intent of "TAC details" without reference to the associated entity. The query processing hardware 102 may instead look to the context (e.g., an entity or account) of a previous query and use that context as a context of the present second query. For example, because the previous first query included an entity of "Apple," the query processing hardware 102 may use that entity as a context for the second query, thereby utilizing the previous entity of "Apple" as an entity for the action associated with the second intent ("TAC details"). Essentially, the query processing hardware 102 assumes the user is referring to a same account as they were previously referencing.

At 412, the query processing hardware 102 reviews the first query to determine a first context of the first query, the first context including the first entity. At 414-422, the query processing hardware 102 performs the action corresponding to the second intent. That action may vary, but in one approach it includes steps similar to those described with reference to steps 310-318 in FIG. 3. For example, at 414, the query processing hardware 102 determines a second application associated with the second intent and the first entity. At 416, the query processing hardware 102 determines a second application query associated with the second intent and the first entity. At 418, the query processing hardware 102 communicates the second application query to the second application. At 420, the query processing hardware 102 receives second result information from the second application responsive to the second application query. At 422, the query processing hardware 102 communicates the second result information to the user device 118. Thus, even in the absence of a complete query (i.e., a query that includes both an intent and the entity subject to that intent), the query processing hardware 102 can determine a context for the query from previous queries and can provide an appropriate response. For example, with brief reference to FIG. 16, which shows an example screenshot 1600 of the dynamic GUI, the GUI provided "TAC Health" for sales account "Apple" without the second query referencing "Apple" (see FIG. 15 at 1502: "Why is the TAC red?").

Figure 5:
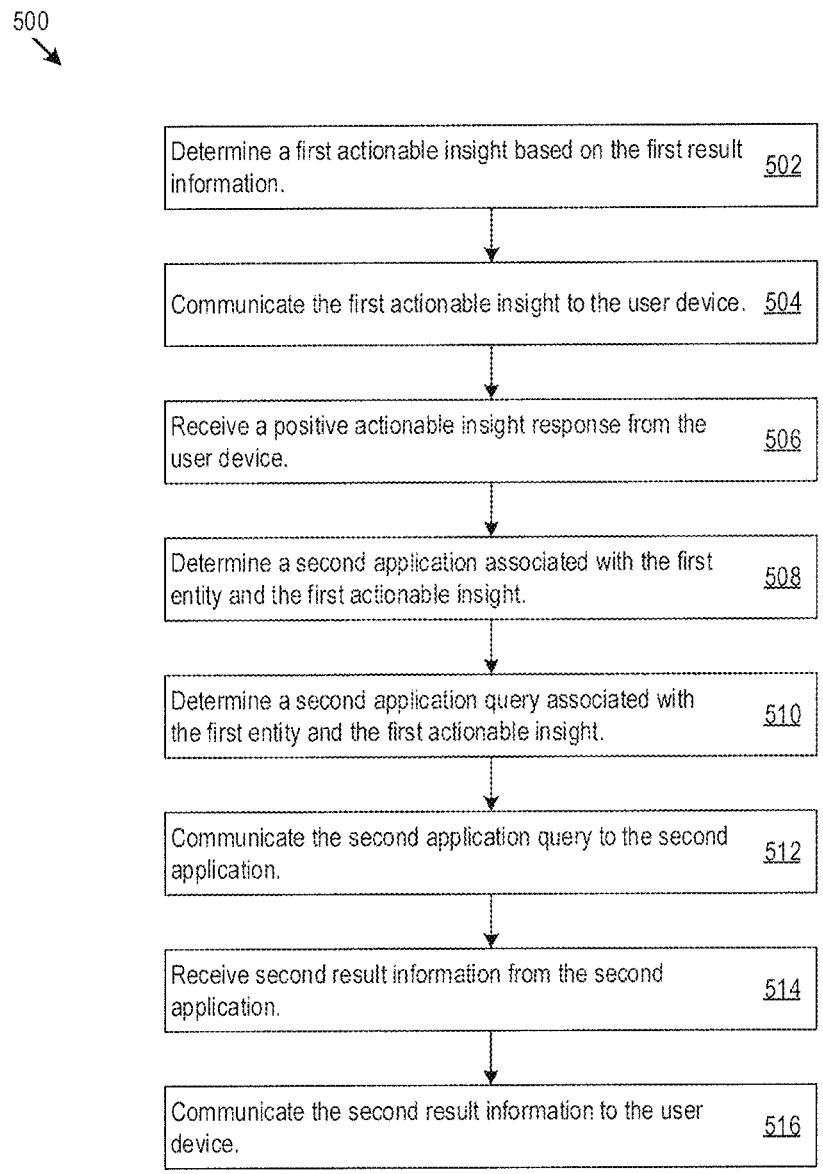
FIG. 5 shows another example flow diagram of logic that the system may implement to determine and communicate an actionable insight.

FIG. 5 shows another example flow diagram of logic 500 that the system 100 may implement to determine and communicate an actionable insight. At 502, the query processing hardware 102 determines a first (or more) actionable insight based on the first result information received from the applications 124. For example, the query processing hardware 102 may analyze the data received from the applications to search for interesting or extraordinary data or trends that may be useful or of interest to a user. Additionally, the query processing hardware 102 may also perform additional queries to the applications to receive additional information related to topics or areas that are typically of interest to a user (e.g., as programmed in actionable insights 220 in memory 206). At 504, the query processing hardware 102 communicates the first actionable insight to the user device 118.

With brief reference to FIG. 14, the user interface circuitry 114 may present the actionable insights 1404 as a list. The actionable insights 1404 may simply provide information, or may include links or other interactive aspects that allow a user to select or interact with a particular actionable insight to receive for information. For example, the third listed actionable insight at 1404 includes a question "Do you want to know more?" and the word "Yes", which can be clicked on or otherwise interacted with. If a user were to click on the "yes," it would represent a positive actionable insight response. Returning to FIG. 5, at 506, the query processing hardware 102 receives the positive actionable insight response from the user device 118. At 508, the query processing hardware 102 determines a second application associated with the first entity and the first actionable insight, and at 510, determines a second application query associated with the first entity and the first actionable insight. At 512, the query processing hardware 102 communicates the second application query to the second application and, at 514, receives the second result information from the second application responsive to the second application query. Thus, for example, with regard to the "TAC Health Score" actionable insight shown at 1404 in FIG. 14, the query processing hardware 102 may query a second application with a second query to extract additional information related to the selected actionable insight.

Figure 15:
FIG. 15 shows another example screenshot of the dynamic graphical user interface as may be provided by the system to provide additional information related to the previous result information.

At 516, the query processing hardware 102 communicates the second result information to the user device 118. For example, with brief reference to FIG. 16, had the user clicked on the "TAC Health" action item at 1404 in FIG. 14 rather than typing in a second query (as is shown in FIG. 15), the system 100 may have provided the "TAC Health" user interface screen shown in screenshot 1600 in response.

Figure 6:
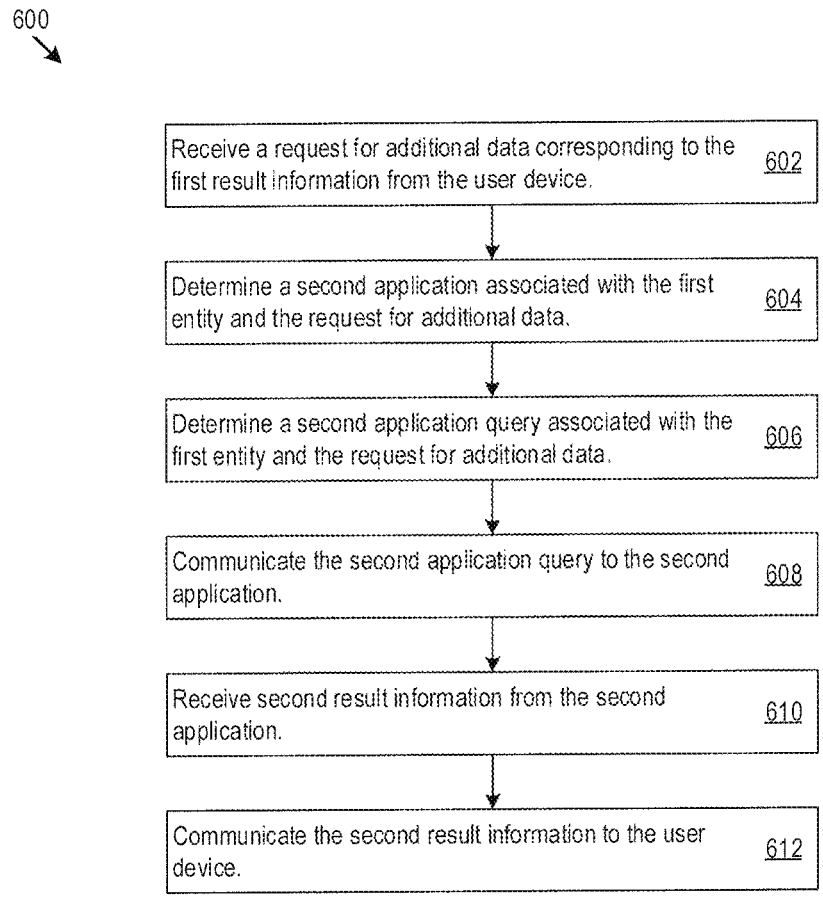
FIG. 6 shows another example flow diagram of logic that the system may implement to provide additional information related to the first result information.

FIG. 6 shows another example flow diagram of logic 600 that the system 100 may implement to provide additional information related to the first result information. At 602, the query processing hardware 102 receives a request for additional data corresponding to the first result information from the user device. For example, with brief reference again to FIG. 15, the GUI may include a button 1504 or other actuator input with a label such as "Get More." A user's selection of this button initiates the user device 118 to communicate the request for additional data corresponding to the first result information. Returning to FIG. 6, at 604, the query processing hardware 102 determines a second application associated with the first entity and the request for additional data and, at 606, determines a second application query associated with the first entity and the request for additional data. At 608, the query processing hardware 102 communicates the second application query to the second application. In this manner, the query processing hardware 102 may be preprogrammed according to control logic 208 to extract additional data from the applications that is related to the previous information provided to the user or to a particular entity or account as a whole. At 610, the query processing hardware 102 receives the second result information from the second application responsive to the second application query and, at 612, communicates the second result information to the user device 118. For example, with brief reference to FIG. 15, upon selection of the "Get More" button 1504, the user interface circuitry 114 may provide the user with additional information 1506 (here, shown as key buyers along with selectable contact information links).

Figure 7:
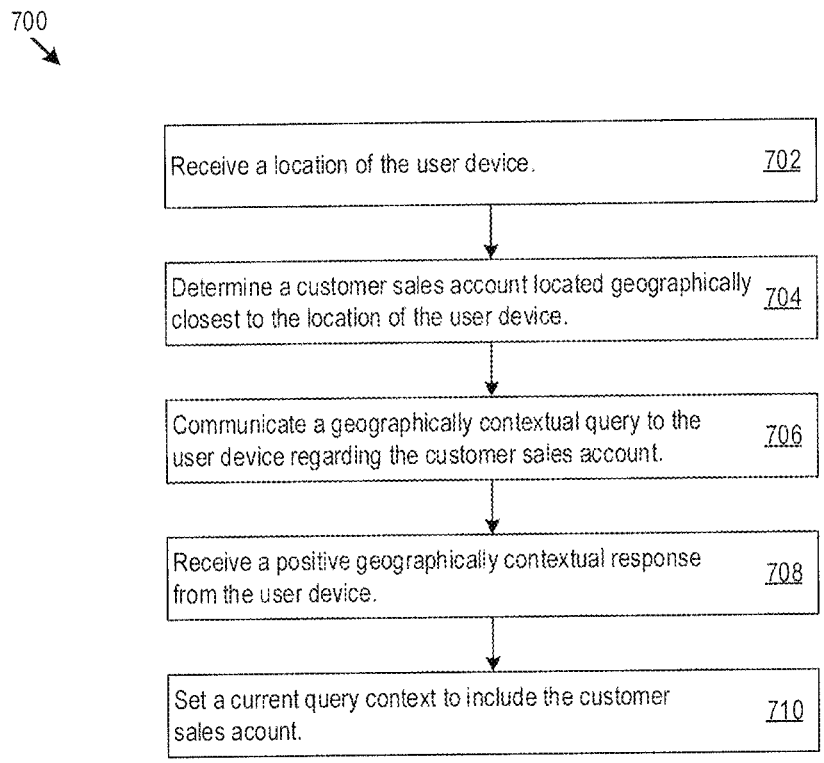
FIG. 7 shows another example flow diagram of logic that the system may implement to determine a context of a query.

FIG. 7 shows another example flow diagram of logic 700 that the system 100 may implement to determine a geographical context of a query. At 702, the query processing hardware 102 receives a geographical location of the user device 118. In one approach, the user device 118 transmits or communicates its current geographical location (e.g., using GPS coordinates or cell tower triangulation) to the user interface circuitry 114. In another approach, the query processing hardware 102 determines the location from a source IP address of the user device 118. At 704, the query processing hardware 102 determines a customer sales account located geographically closest to the location of the user device 118. At 706, the query processing hardware 102 communicates a geographically contextual query to the user device 118 regarding the customer sales account. With brief reference to FIG. 13, which illustrates the GUI at an initial log-in state, the user interface circuitry 114 provides the GUI with an indication of a nearby account at 1304. In this example, the query processing hardware 102 has determined that a sales account (Apple) is near the current location of the user device 118, and asks the user if that is the account about which the user would like to receive information. The user can click an option confirming that they would like to receive information about that account, which is a positive geographically contextual response. Returning to FIG. 7, at 708, the query processing hardware 102 receives the positive geographically contextual response from the user device 118. At 710, the query processing hardware 102 sets a current query context to include the customer sales account. Further, the query processing hardware 102 may also provide information about the selected customer sales account (e.g., an update or an overview of the sales account, as is shown in FIG. 14).

Figure 8:
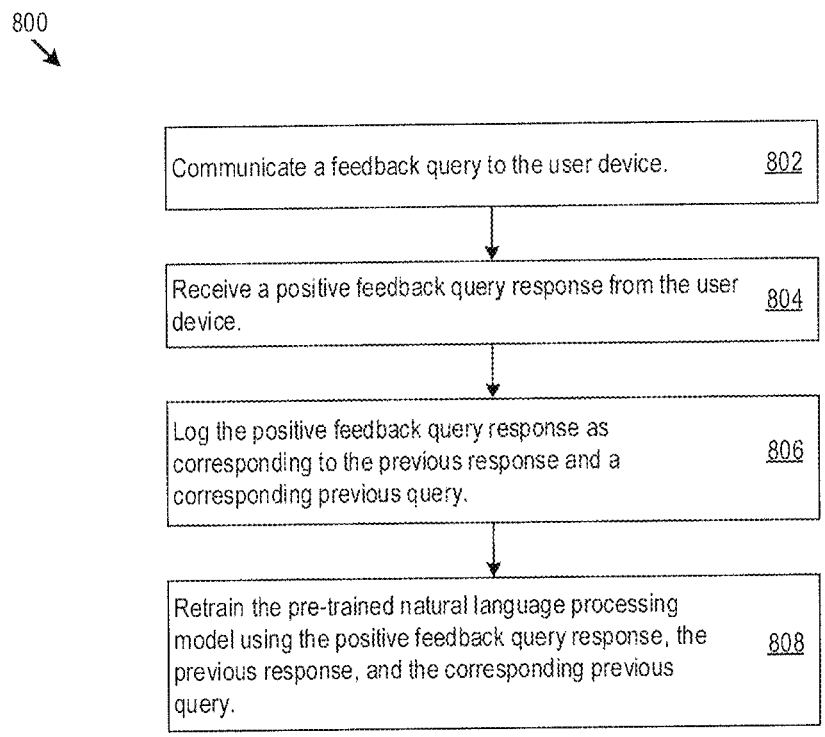
FIG. 8 shows another example flow diagram of logic that the system may implement to receive and utilize feedback responses.
Figure 26:
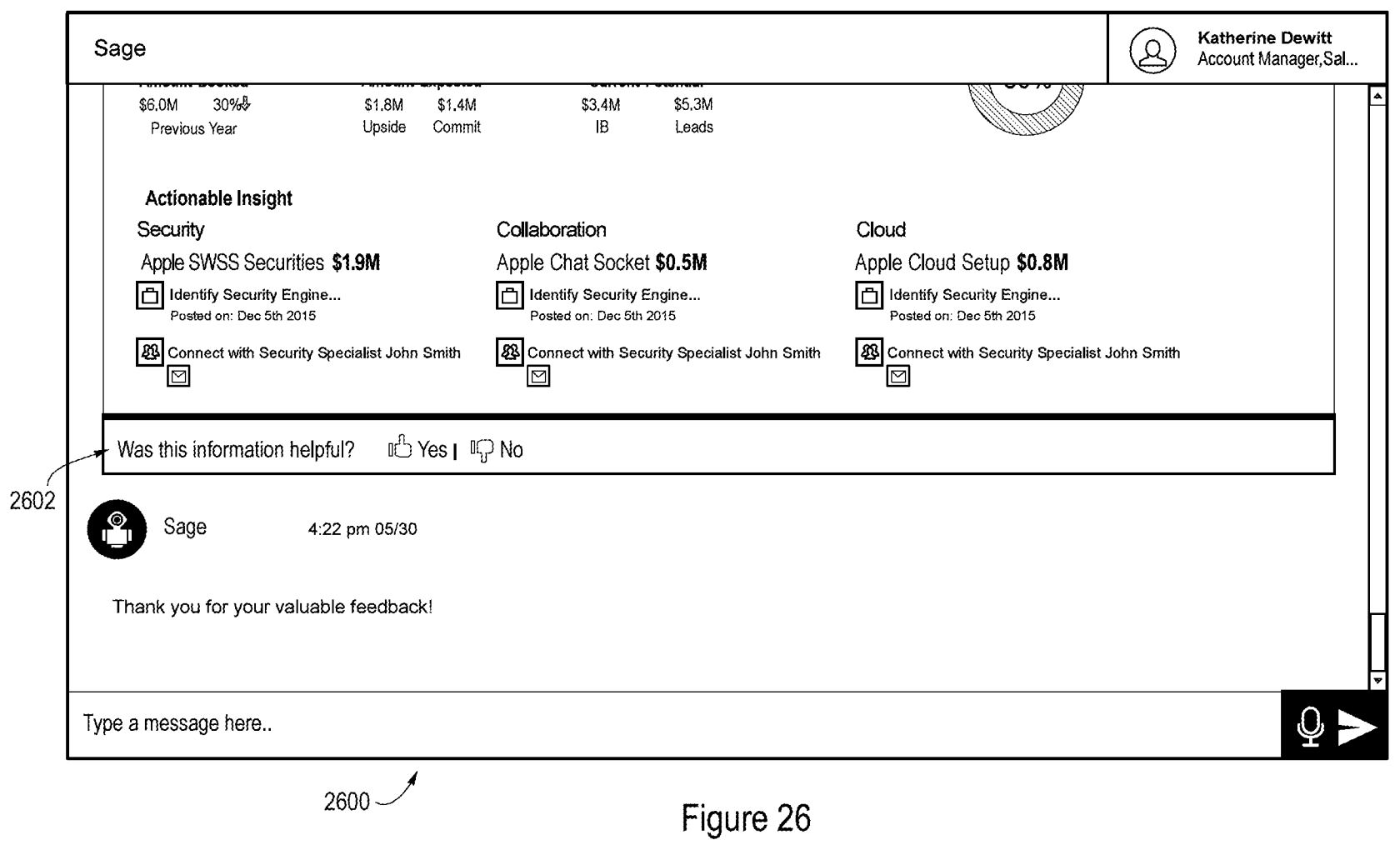

FIG. 8 shows another example flow diagram of logic 800 that the system may implement to receive and utilize feedback responses from the user device 118. At 802, the query processing hardware 102 communicates a feedback query to the user device 118. Referring briefly to FIG. 26, which illustrates another example screenshot 2600 of the dynamic GUI, the GUI includes a feedback solicitation area at 2602 ("Was this information helpful?"). The user can select a binary response (yes or no) as a feedback query response. Returning to FIG. 8, at 804, the query processing hardware 102 receives the positive feedback query response from the user device 118. At 806, the query processing hardware 102 logs the positive feedback query response as corresponding to the previous response (e.g., the first result information) and a corresponding previous query (e.g., the first query). The query processing hardware 102 may store the feedback within the feedback log 234 within the memory 206 or within another database. At 808, the AI engine circuitry 108 may retrain the pre-trained natural language processing model 110 using the positive feedback query response (or a negative response), the previous response, and the corresponding previous query. The AI engine circuitry 108 may wait until it receives a set amount of data prior to retraining, or may retrain as new feedback arrives. In this manner, the system 100 learns from the feedback received as to how pertinent or relevant received answers or data is to entered queries.

Figure 9:
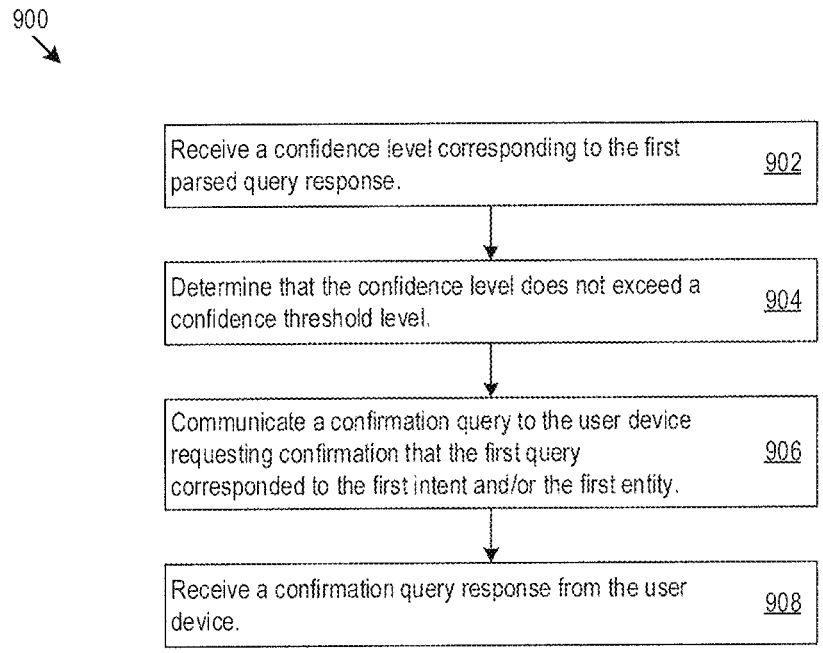
FIG. 9 shows another example flow diagram of logic that the system may implement to confirm an intent or entity of a query.

FIG. 9 shows another example flow diagram of logic 900 that the system 100 may implement to confirm an intent or entity of a query. Prior to determining the first application and the first application query associated with the first entity or the first intent (i.e., FIG. 3 at 310 and 312), the AI engine circuitry 108 may generate a confidence level corresponding to the first parsed query response. At 902, the query processing hardware 102 receives that confidence level from the AI engine circuitry 108. At 904, query processing hardware 102 determines whether the confidence level exceeds a confidence threshold level (e.g., 50%). If the query processing hardware 102 determines that the confidence level does not exceed the threshold confidence level, at 906, the query processing hardware 102 may communicate a confirmation query to the user device 118. The confirmation query may be a request for confirmation that the first query corresponded to the first intent and/or the first entity (e.g., "Do you want an overview of Apple?"). The confirmation query is presented to the user via the GUI on the user device 118, and the user can respond. At 908, the query processing hardware 102 receives a confirmation query response from the user device 118 confirming that was the proper intent and entity, at which point the query processing hardware 102 will resume with the remainder of the logic 300 in FIG. 3. If the query processing hardware 102 received a negative confirmation query response from the user device 118, the query processing hardware 102 may ask the user to rephrase the query, or may present a list of popular or common queries the user can enter. Further, the query processing hardware 102 may save the query and the corresponding confirmation query response (or negative response) within the feedback log 234 to help train the natural language processing model 110.

Figure 10:
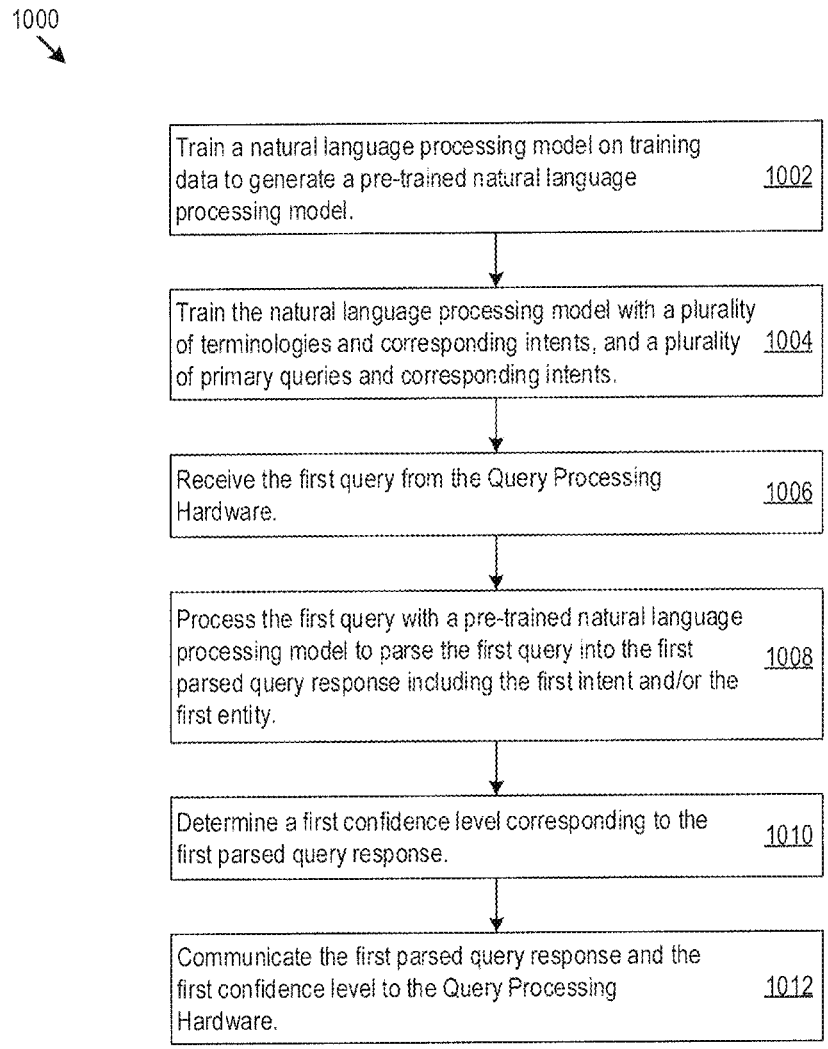
FIG. 10 shows another example flow diagram of logic that the system may implement to train and utilize a natural language processing model.

FIG. 10 shows another example flow diagram of logic 1000 that the system 100 may implement to train and utilize a natural language processing model 110. At 1002, prior to receiving the first query from the query processing hardware 102, the AI engine circuitry 108 trains the natural language processing model with training data to generate the pre-trained natural language processing model 110. The training data includes at least one term included in the first query and a corresponding natural language processing response including the first intent and/or the first entity. By this, the AI engine circuitry 108 trains the pre-trained natural language processing model 110 to output an appropriate entity and/or intent output responsive to a received input query. As discussed at 1004, training may include training the natural language processing model 110 with a plurality of terminologies and corresponding intents, and a plurality of primary queries and corresponding intents. Table 1, below, provides an example representative list of terminologies that may be present within a query with which the natural language processing model 110 may be trained within a high tech business-to-business sales context. Table 2, below, provides an example representative list of primary queries that may be present in a query with which the natural language processing model 110 may be trained in a high tech business-to-business sales context.

TABLE 1

Account Overview
Technical Case Health
My Forecast
Install Base Summary
Pipeline Summary
Refresh Opportunity
Renew Opportunity
Qualified Leads
Actionable Insights
Trend Analysis
Whitespace
Accounts
Expedite Order
Export Status
Goal to Cash
Coal Attainment
Commission
Attainment
Backlogs
Booking Gaps
Revenue Visibility

TABLE 2

Provide an overview of Apple?
Why TAC Health is Red?
TAC Health?
What's my forecast?
How am I doing?
IB summary?
Pipeline summary?
What are the whitespace accounts?
Can I expedite order # 123456789?
Can I get export?
What's my status of export?

The AI engine circuitry 108 may also train the natural language processing model 110 on multiple example conversation flows to train the model to account for conversation flows in strings of queries. At 1006, the AI engine circuitry 108 receives the first query from the query processing hardware 102 (coordinating with step 304 in FIG. 3). At 1008, AI engine circuitry 108 processes the first query with the pre-trained natural language processing model 110 to parse the first query into the first parsed query response including the first intent and/or the first entity. The natural language processing is performed according to any known methods or by known service providers, including those mentioned herein (e.g., IBM Watson). At 1010, the AI engine circuitry 108 determines the first confidence level corresponding to the first parsed query response. At 1012, the AI engine circuitry 108 communicates the first parsed query response and the first confidence level to the query processing hardware 102 (coordinating with step 308 in FIGS. 3 and 902 in FIG. 9).

Figure 11:
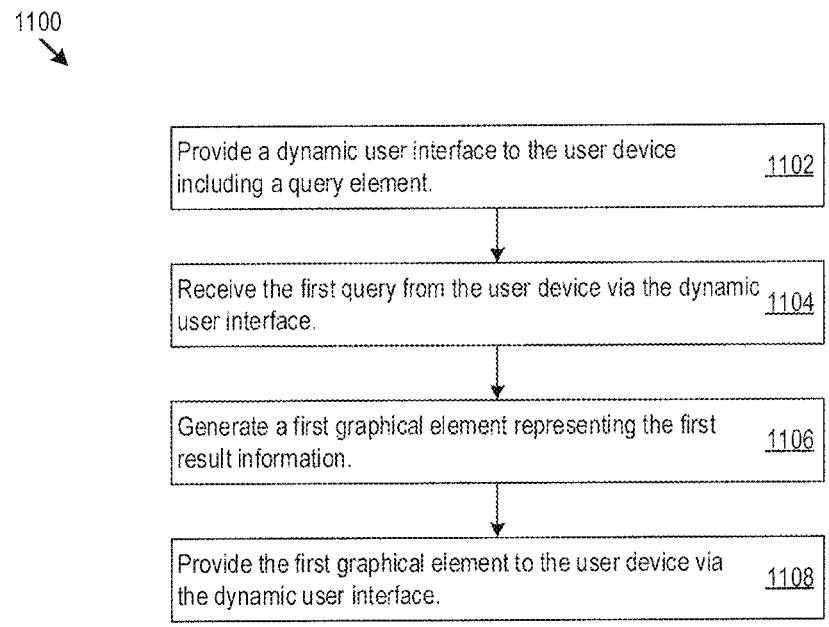
FIG. 11 shows another example flow diagram of logic that the system may implement to provide a dynamic user interface.

FIG. 11 shows another example flow diagram of logic 1100 that the system 100 may implement to provide a dynamic user interface. At 1102, the user interface circuitry 114 provides a dynamic user interface to the user device 118. The dynamic user interface includes a query entry element (see 1302 in FIG. 13). At 1104, the user interface circuitry 114 receives the first query from the user device 118 via the dynamic user interface. At 1106, the user interface circuitry 114 generates a first graphical element representing the first result information received from the query processing hardware 102 and, at 1108, provides the first graphical element to the user device 118 via the dynamic user interface. For example, depending on the programming of the GUI, the user interface circuitry 114 may generate and provide a graph or a table (or some other graphical element) representative of data received responsive to the query. FIGS. 13-26, discussed below, include many examples of such graphical elements.

Figure 12:
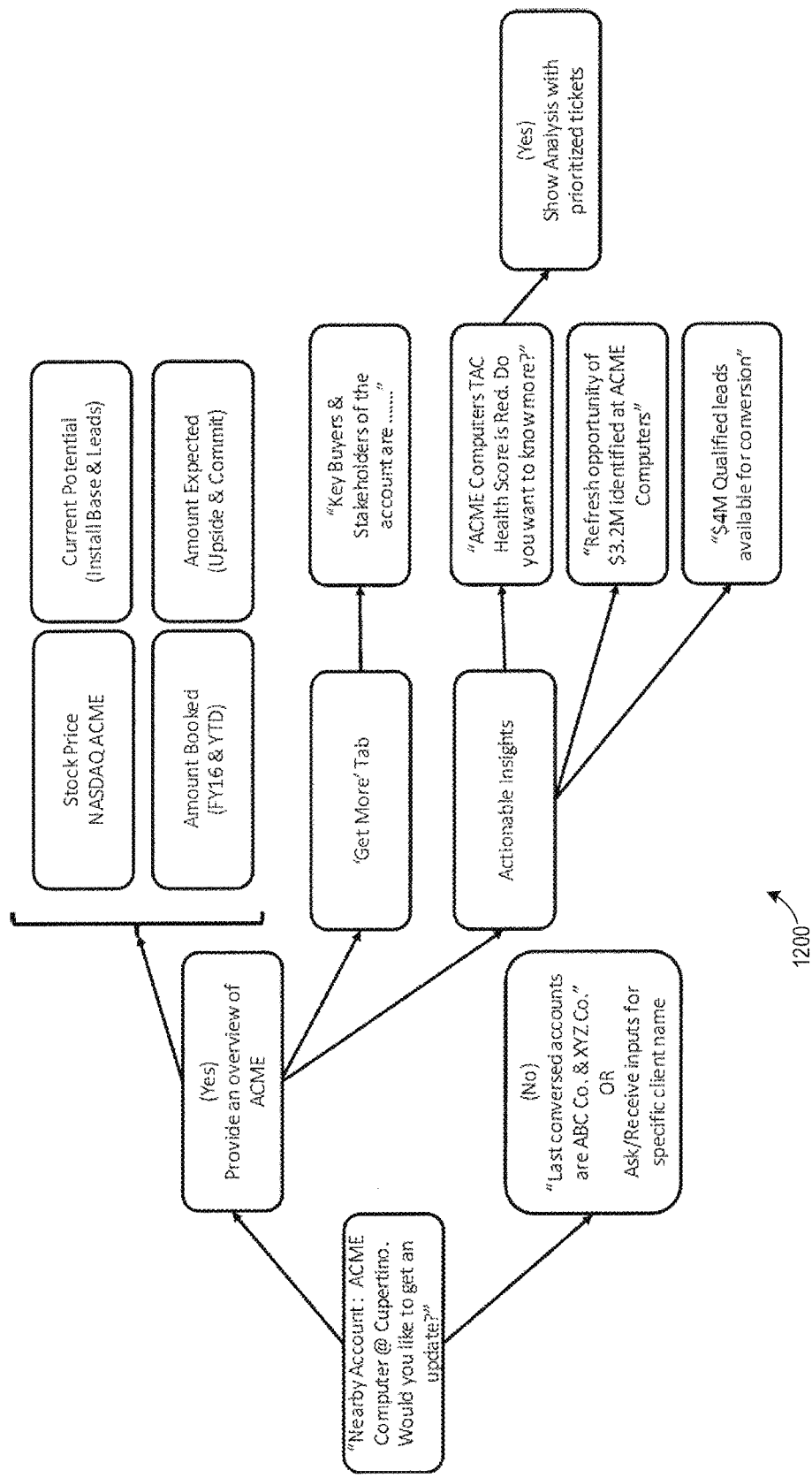
FIG. 12 shows an example interactive conversation flow as may be implemented by the system.

FIG. 12 shows an example interactive conversation flow 1200 as may be implemented by the system 100. The example interactive conversation flow 1200 may represent a portion of a decision tree 210 as part of the control logic 208 stored in the memory 206.

FIGS. 13-26 show example screenshots of the dynamic GUI during an example conversation flow between a user and the system 100. As discussed above, FIG. 13 shows an example screenshot 1300 of the dynamic GUI providing a geographically contextual query 1304. In this example, screenshot 1300 is the initial displayed screen within the conversation flow. The system 100 allows the user to select the geographically close account at 1304, and also provides a list of recent accounts the user may have recently used at 1306. At 1302, the user has entered a first query. FIG. 14 shows another example screenshot 1400 of the dynamic GUI providing an overview of an account responsive to the query entered at 1302. In this example, the GUI provides an overview of an account, including one or more interactive graphical elements 1402 as well as a list of actionable insights at 1404. FIG. 15 shows another example screenshot 1500 of the dynamic GUI providing additional information related to the previous result information (e.g., after selecting the "Get More" button 1504. The additional information provided in this example is a list of key buyers for the account.

Figure 16:
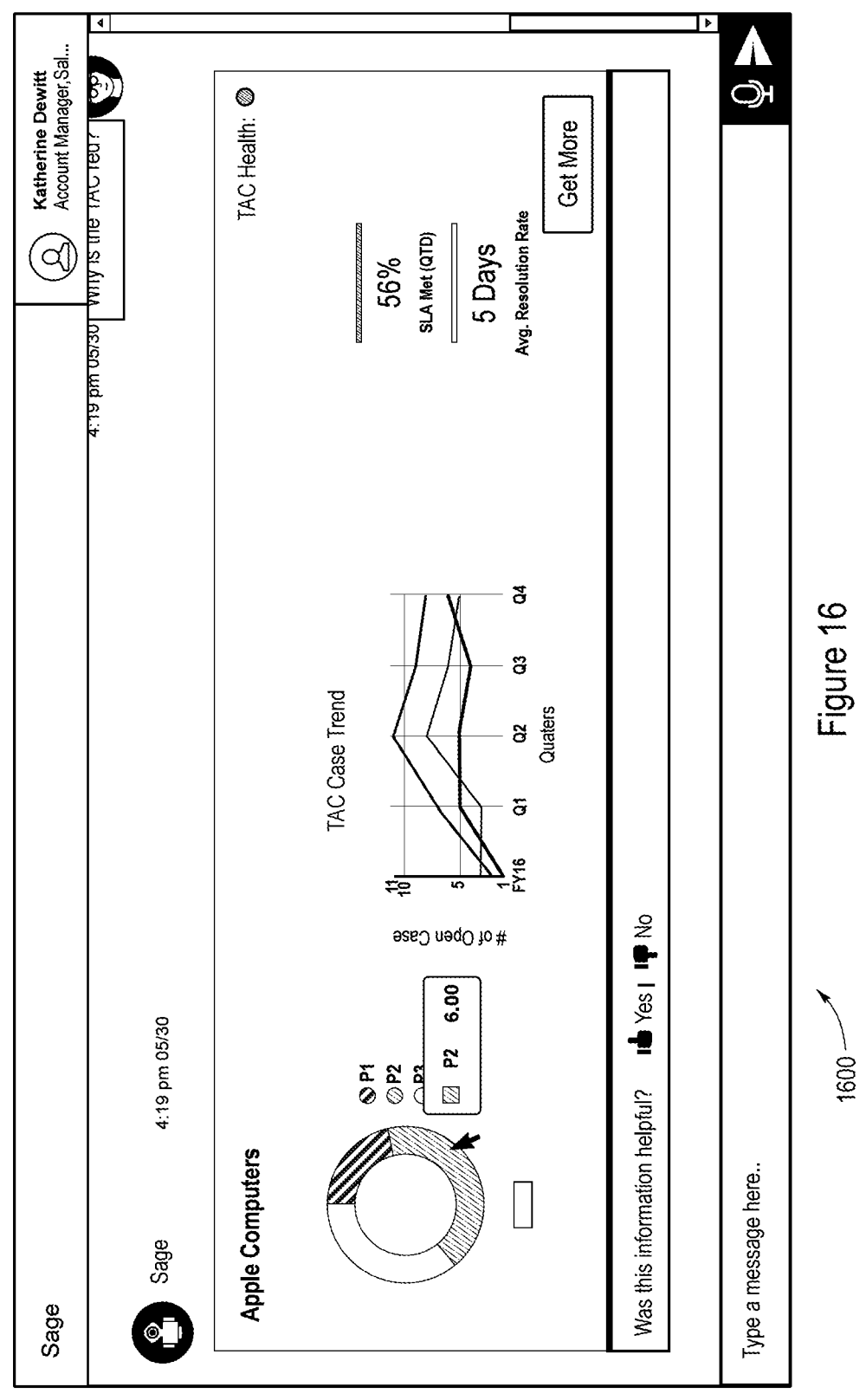
Figure 17:
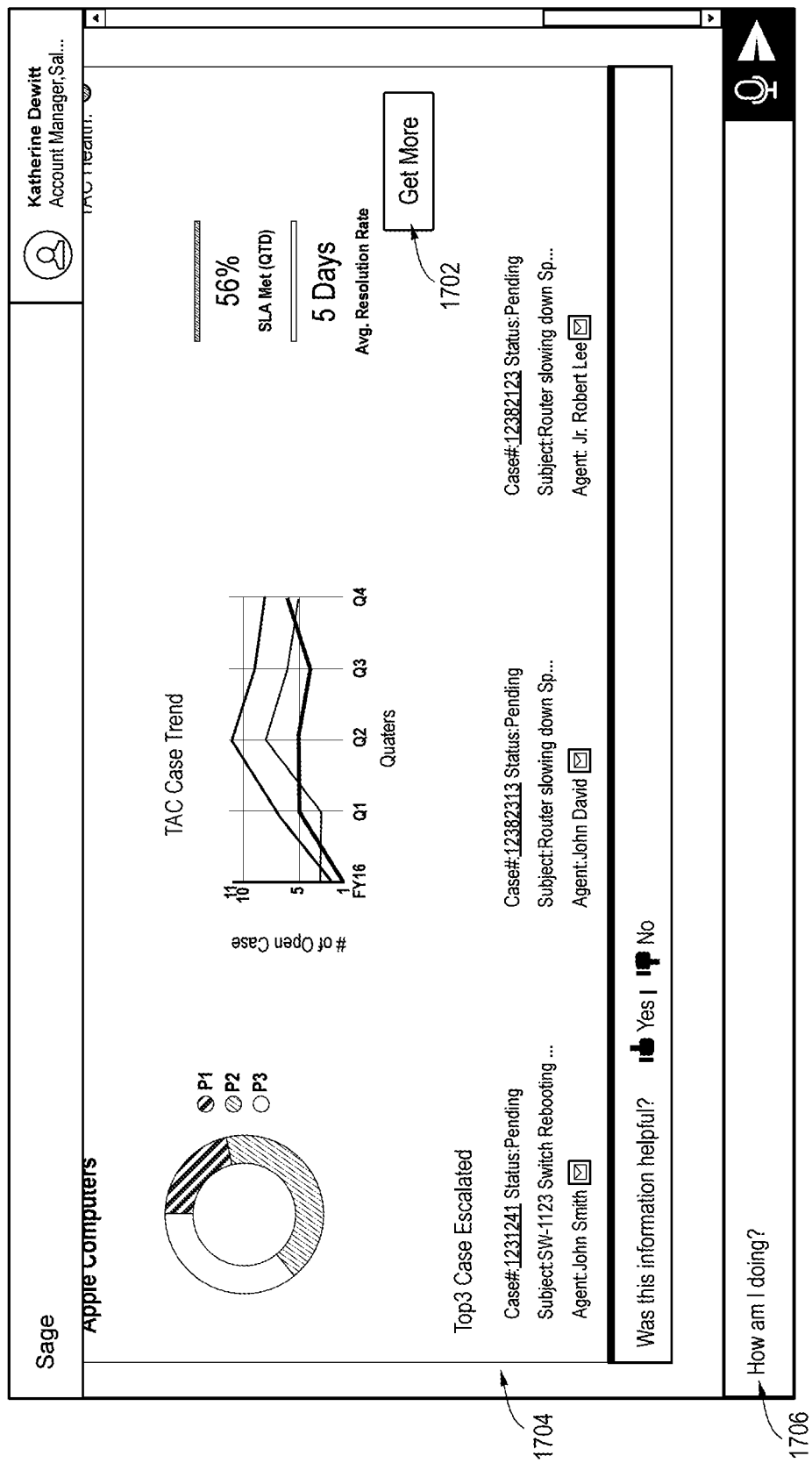
FIG. 17 shows another example screenshot of the dynamic graphical user interface as may be provided by the system to provide additional information related to the previous result information.
Figure 18:
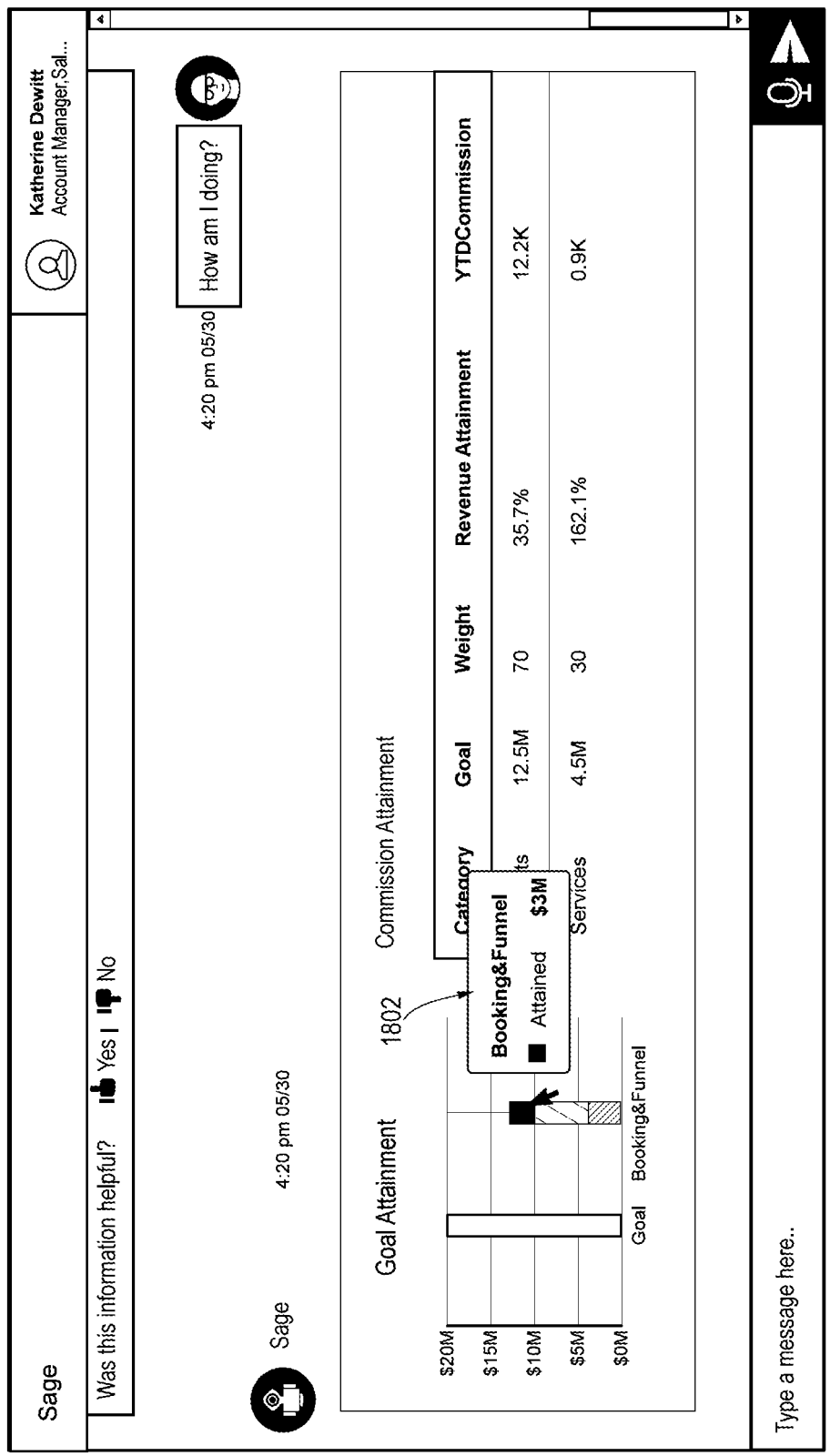
FIG. 18 shows another example screenshot of the dynamic graphical user interface as may be provided by the system to provide agent performance information.
Figure 19:
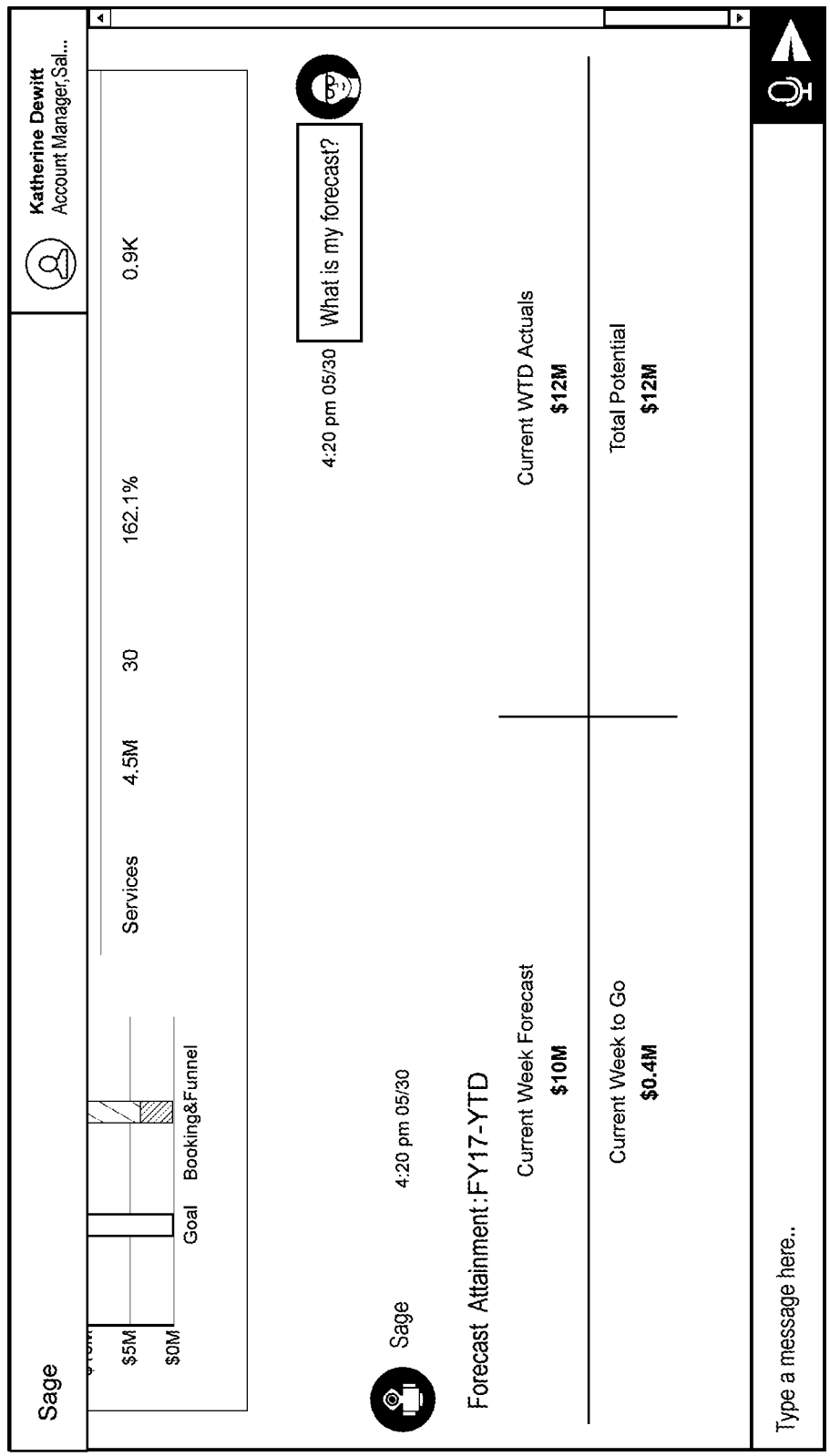
FIG. 19 shows another example screenshot of the dynamic graphical user interface as may be provided by the system to provide additional agent performance information.

FIG. 16 shows another example screenshot 1600 of the dynamic GUI providing details regarding the Health of the Technical Assistance Center (TAC). FIG. 17 shows another example screenshot 1700 of the dynamic GUI providing additional information related to the previous result information (e.g., the TAC Health screen shown in FIG. 16). Here, responsive to a user pressing the "Get More" button 1702, the dynamic GUI provides a listing of the top three escalated cases at 1704. At 1706, a sales agent user has entered a new query regarding their sales performance ("How am I doing?"). FIG. 18 shows another example screenshot 1800 of the dynamic GUI providing agent performance information. As discussed elsewhere, the GUI is dynamic and interactive such that it is responsive to user interactions, as is shown by the pop-up information box 1802 that is displayed when the mouse pointer hovers over a bar chart. FIG. 19 shows another example screenshot 1900 of the dynamic GUI providing additional agent performance information. In this example, the GUI provides sales forecast attainment report in response to a query of "What is my forecast?"

Figure 20:
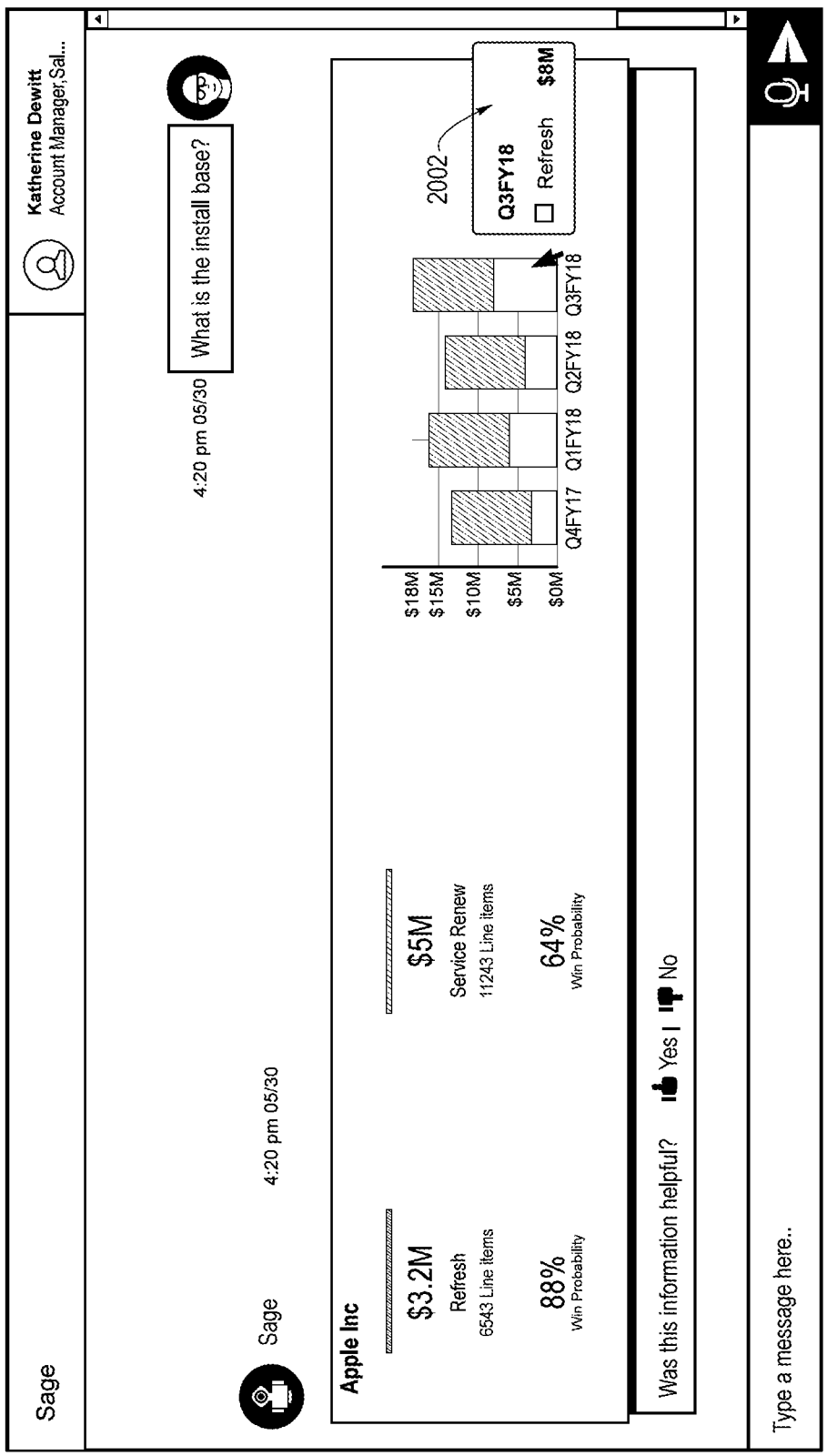
FIG. 20 shows another example screenshot of the dynamic graphical user interface as may be provided by the system to provide details regarding an account.

FIG. 20 shows another example screenshot 2000 of the dynamic GUI providing additional details regarding an account. In this example, the user provided a query of "What is the install base?" and the system 100 responded by displaying corresponding information. It is worth noting that the context of the install base was not included within the query, but the system 100 utilized the context from a previous query (but not the immediately previous query) that related to the particular sales account. Again, the GUI is dynamic and interactive such that it is responsive to user interactions, as is shown by the pop-up information box 2002 that is displayed when the mouse pointer hovers over a bar chart.

Figure 21:
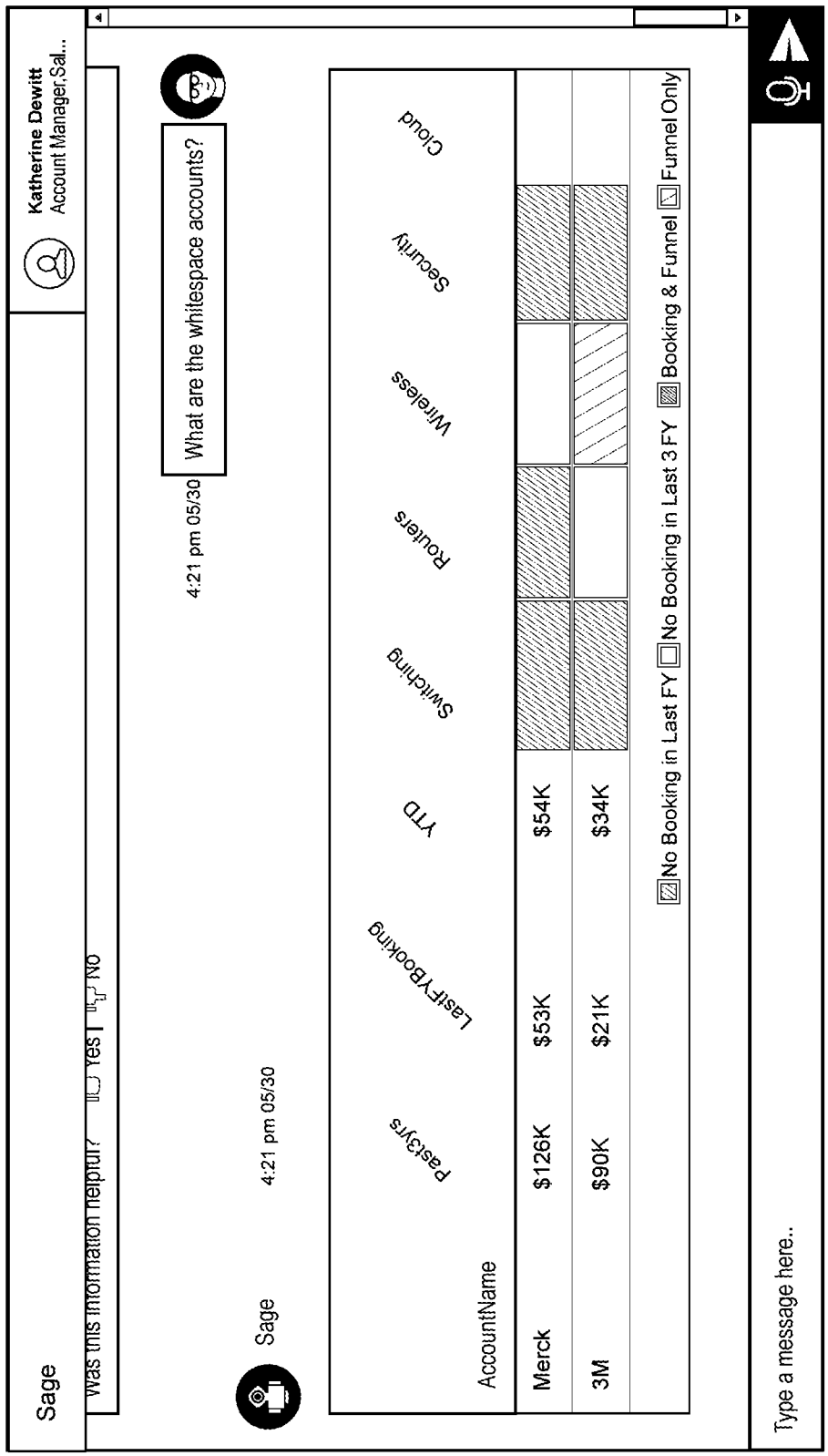
FIG. 21 shows another example screenshot of the dynamic graphical user interface as may be provided by the system to provide information regarding whitespace areas for an account.
Figure 22:
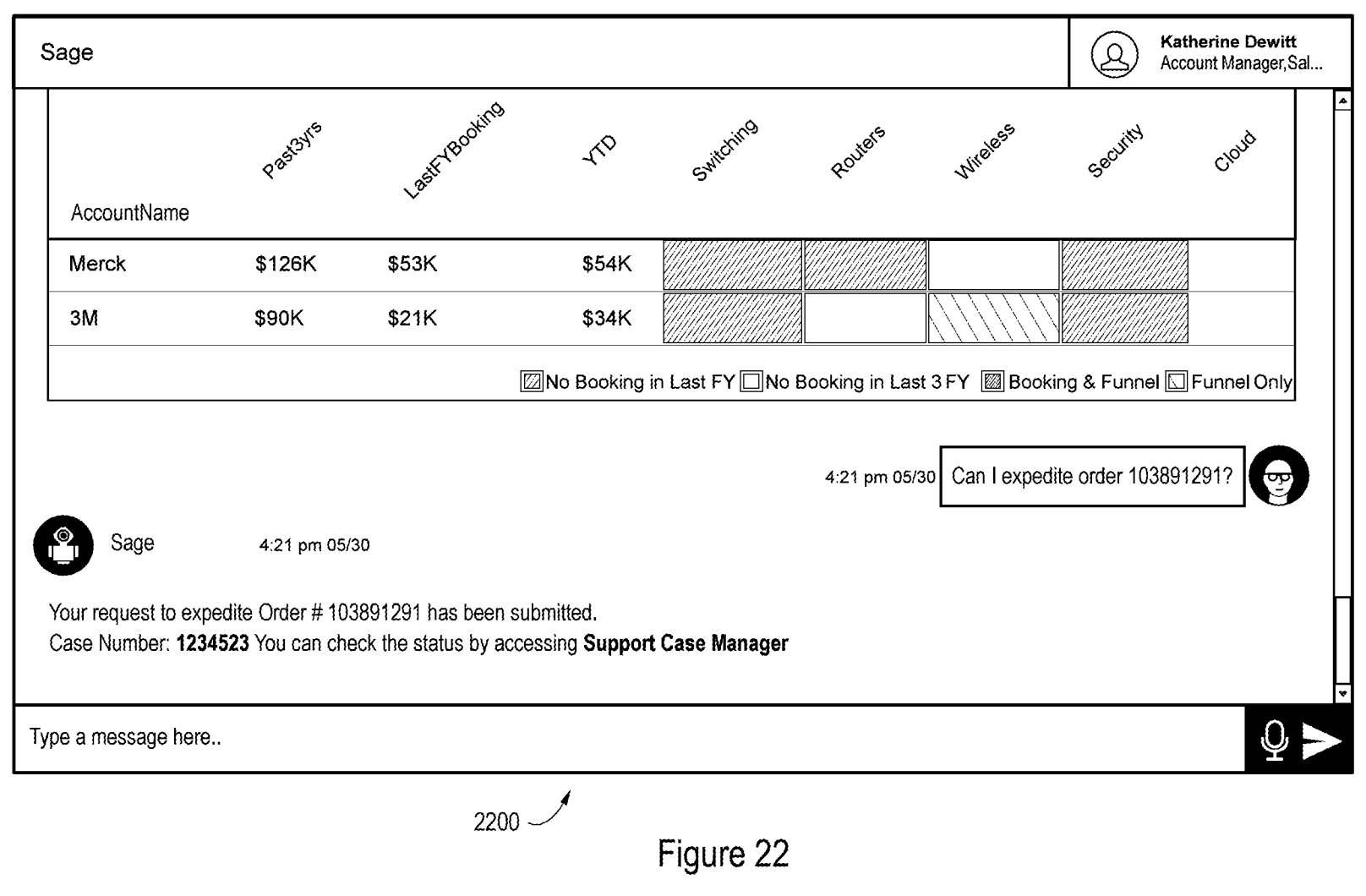
Figure 23:
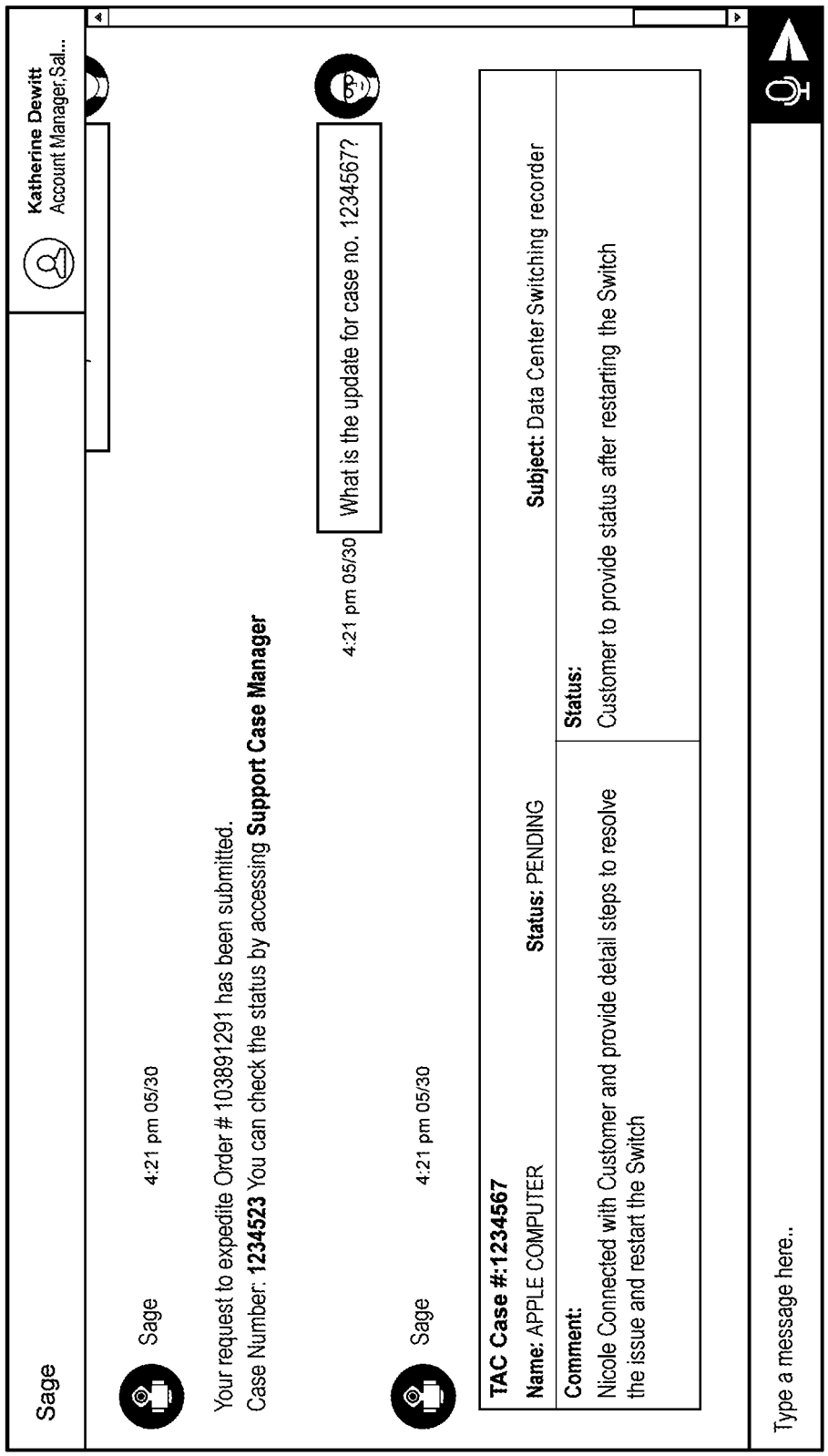
FIG. 23 shows another example screenshot of the dynamic graphical user interface as may be provided by the system to provide details on a case number.
Figure 24:
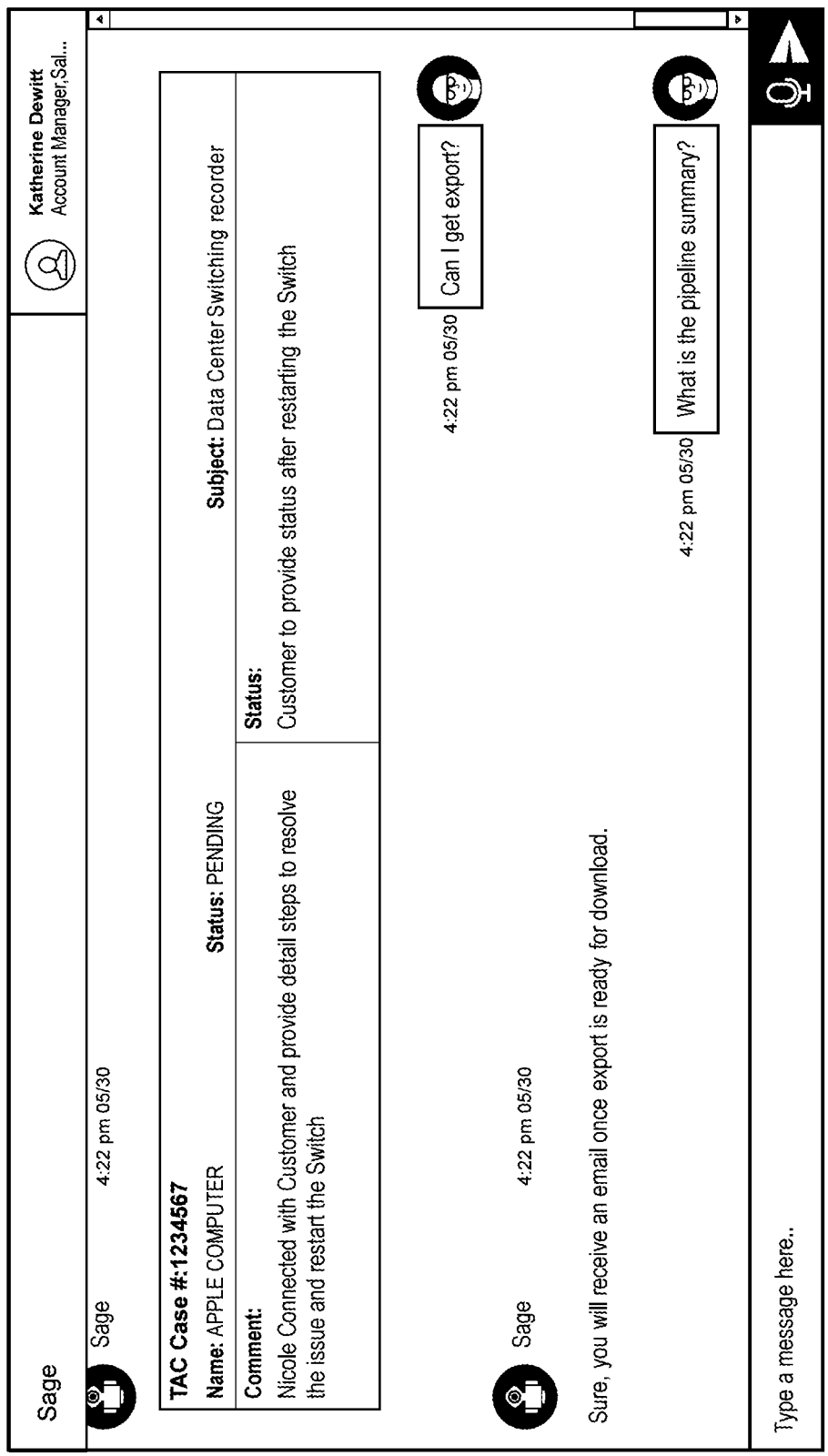
FIG. 24 shows another example screenshot of the dynamic graphical user interface as may be provided by the system to provide an export summary.
Figure 25:
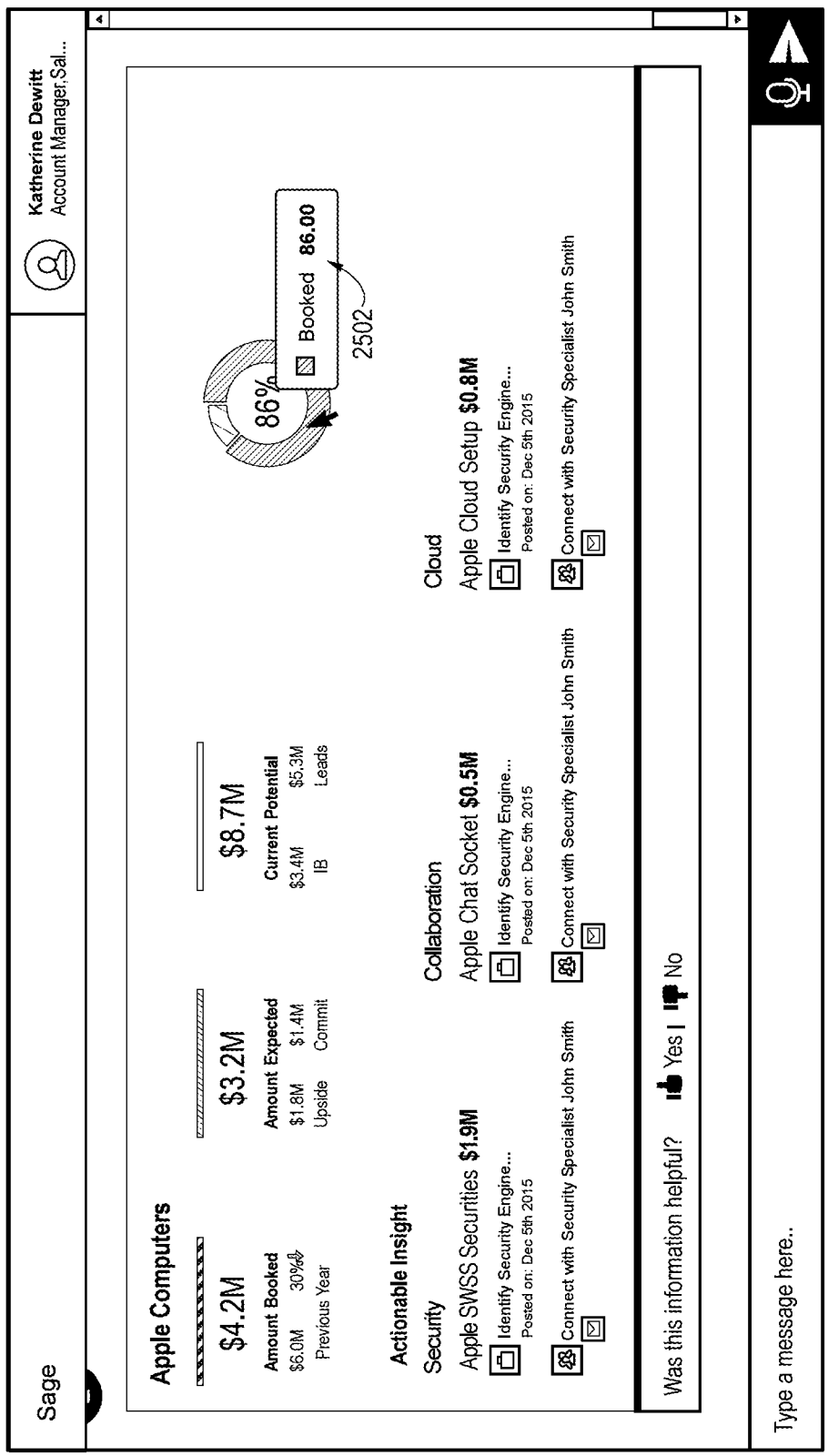
FIG. 25 shows another example screenshot of the dynamic graphical user interface as may be provided by the system to provide a pipeline summary for an account.

FIG. 21 shows another example screenshot 2100 of the dynamic GUI providing information regarding whitespace areas for an account responsive to a query about whitespaces. FIG. 22 shows another example screenshot 2200 of the dynamic GUI as may be provided by the system 100 to expedite an order. FIG. 23 shows another example screenshot 2300 of the dynamic GUI providing details on a case number. FIG. 24 shows another example screenshot 2400 of the dynamic GUI as may be provided by the system 100 to provide an export summary. FIG. 25 shows another example screenshot 2500 of the dynamic GUI providing a pipeline summary for an account. Again, the GUI is dynamic and interactive such that it is responsive to user interactions, as is shown by the pop-up information box 2502 that is displayed when the mouse pointer hovers over a pie chart. FIG. 26 shows another example screenshot 2600 of the dynamic GUI to receive feedback on a previous query and corresponding response at 2602 ("Was this information helpful?").

Those of skill in the art will understand that the particulars of the GUI discussed herein are merely examples and are not meant to limit the claims of this application. Further, those if skill in the art will understand that the user interface can include any graphical or non-graphical aspects not specifically discussed herein and be within the scope of the present disclosure. Moreover, those of skill in the art will understand that the example contextual environment utilized (e.g., sales context) is simply one of many possible contexts or application settings in which the interactive query processing system 100 can be utilized.

So configured, the interactive query processing system 100 provides a user interface, including a "chat bot," capable of receiving natural language queries from users and user devices 118, processing those queries to determine intents and entities, extracting data from applications and portals, synthesizing the data, and displaying the data to the user via the user interface in a useful, easy to understand, and unified format. This enables the user to utilize a single user interface to receive answers to queries or questions rapidly instead of seeking out answers from multiple different portals or dashboards. Additionally, the system 100 provides actionable insights without requiring a user to sort or analyze data from multiple sources. These actionable insights are provided on the fly and with essentially no work on part of the user. In a sales context, the system 100 provides high tech account executives with information to help accelerate a win rate for a client engagement. The system 100 intelligently and proactively provides recommendations to the account executive by extracting and analyzing information from multiple portals and dashboards in a B2B setting. The user interface is dynamic instead of static, and is unique with respect to existing UI/UX features in the sales context.

The system 100 provides a technical effect and benefit of reduction in overall network traffic load and storage usage by reducing repeated querying and transmission of raw data or large reports from multiple applications or platforms to the user. Instead, a curated set of data is provided specifically tailored to the user's query, giving the user only what they require or what they request. In this regard, performance of an overall system or network is improved, costs are reduced (e.g., to transmit and save large datasets), and complexity is decreased.

The methods, devices, processing, circuitry, structures, architectures, and logic described above may be implemented in many different ways and in many different combinations of hardware and software. For example, all or parts of the implementations may be circuitry that includes an instruction processor, such as a Central Processing Unit (CPU), microcontroller, or a microprocessor; or as an Application Specific Integrated Circuit (ASIC), Programmable Logic Device (PLD), or Field Programmable Gate Array (FPGA); or as circuitry that includes discrete logic or other circuit components, including analog circuit components, digital circuit components or both; or any combination thereof. The circuitry may include discrete interconnected hardware components or may be combined on a single integrated circuit die, distributed among multiple integrated circuit dies, or implemented in a Multiple Chip Module (MCM) of multiple integrated circuit dies in a common package, as examples.

Accordingly, the circuitry may store or access instructions for execution, or may implement its functionality in hardware alone. The instructions may be stored in a tangible storage medium that is other than a transitory signal, such as a flash memory, a Random Access Memory (RAM), a Read Only Memory (ROM), an Erasable Programmable Read Only Memory (EPROM); or on a magnetic or optical disc, such as a Compact Disc Read Only Memory (CDROM), Hard Disk Drive (HDD), or other magnetic or optical disk; or in or on another machine-readable medium. A product, such as a computer program product, may include a storage medium and instructions stored in or on the medium, and the instructions when executed by the circuitry in a device may cause the device to implement any of the processing described above or illustrated in the drawings.

The implementations may be distributed. For instance, the circuitry may include multiple distinct system components, such as multiple processors and memories, and may span multiple distributed processing systems. Parameters, databases, and other data structures may be separately stored and managed, may be incorporated into a single memory or database, may be logically and physically organized in many different ways, and may be implemented in many different ways. Example implementations include linked lists, program variables, hash tables, arrays, records (e.g., database records), objects, and implicit storage mechanisms. Instructions may form parts (e.g., subroutines or other code sections) of a single program, may form multiple separate programs, may be distributed across multiple memories and processors, and may be implemented in many different ways. Example implementations include stand-alone programs, and as part of a library, such as a shared library like a Dynamic Link Library (DLL). The library, for example, may contain shared data and one or more shared programs that include instructions that perform any of the processing described above or illustrated in the drawings, when executed by the circuitry.

Various implementations have been specifically described. However, many other implementations are also possible.

What is claimed is:

1. A method comprising:
in a query processing hardware system:
obtaining a first query from a user device;
communicating the first query to artificial intelligence (AI) engine circuitry, wherein the AI engine circuitry executes a pre-trained natural language processing model on the first query, the pre-trained natural language processing model having been trained with a plurality of terminologies and a plurality of primary queries;
receiving, from the AI engine circuitry, a first parsed query response, the first parsed query response including at least one of a first intent in the first query or a first entity in the first query;
determining a first application associated with the at least one of the first entity or the first intent based on a plurality of decision trees and a plurality of mappings, wherein the plurality of decision trees provides pre-programmed actions responsive to the at least one of the first entity or the first intent, and the plurality of mappings maps the at least one of the first entity or the first intent to the first application;
determining a first application query associated with the at least one of the first entity or the first intent based on the plurality of decision trees and the plurality of mappings, wherein the plurality of mappings maps the at least one of the first entity or the first intent to the first application query;
communicating the first application query to the first application;
receiving first result information from the first application responsive to the first application query;
communicating the first result information to the user device;
obtaining a second query from the user device, wherein the second query is subsequent to the first query and a context of the second query is selected from the first result information;
communicating the second query to the AI engine circuitry;
receiving, from the AI engine circuitry, a second parsed query response, the second parsed query response including a second intent in the second query;
determining that an action corresponding to the second intent requires a corresponding entity field;
determining that the second parsed query response did not include a second entity;
when it is determined that the second parsed query response did not include the second entity, reviewing the first query to determine a first context of the first query and using the determined first context as a current context of the second query, wherein the first context includes the first entity;
determining a second application associated with the second intent and the first entity;
determining a second application query associated with the second intent and the first entity;
communicating the second application query to the second application;
receiving second result information from the second application responsive to the second application query, wherein the second application provides the second result information that is more detailed than the first result information provided by the first application; and
communicating the second result information to the user device.

2. The method of claim 1, further comprising:
in user interface circuitry:
providing a dynamic user interface to the user device, the dynamic user interface including a query entry element;
receiving the first query from the user device via the dynamic user interface;
generating a first graphical element representing the first result information; and
providing the first graphical element to the user device via the dynamic user interface.

3. The method of claim 1, further comprising:
in the query processing hardware system:
determining a first actionable insight based on the first result information, the first actionable insight corresponding to the first entity;
communicating the first actionable insight to the user device;
receiving a positive actionable insight response from the user device;
determining a second application associated with the first entity and the first actionable insight;
determining a second application query associated with the first entity and the first actionable insight;
communicating the second application query to the second application;
receiving second result information from the second application responsive to the second application query; and
communicating the second result information to the user device.

4. The method of claim 1, further comprising:
receiving a request for additional data corresponding to the first result information from the user device;
determining a second application associated with the first entity and the request for additional data;
determining a second application query associated with the first entity and the request for additional data;
communicating the second application query to the second application;
receiving second result information from the second application responsive to the second application query; and
communicating the second result information to the user device.

5. The method of claim 1, further comprising:
at the AI engine circuitry:
receiving the first query from the query processing hardware system;
processing the first query with a pre-trained natural language processing model to parse the first query into the first parsed query response including the at least one of the first intent or the first entity;
determining a first confidence level corresponding to the first parsed query response; and
communicating the first parsed query response and the first confidence level to the query processing hardware system.

6. The method of claim 5, further comprising, prior to receiving the first query from the query processing hardware system, training a natural language processing model with training data to generate the pre-trained natural language processing model, the training data comprising at least one term included in the first query and a corresponding natural language processing response including at least one of the first intent or the first entity.

7. The method of claim 6 further comprising training the natural language processing model with:
a plurality of terminologies and corresponding intents, and
a plurality of primary queries and corresponding intents.

8. The method of claim 1, further comprising:
prior to determining the first application and the first application query associated with the at least one of the first entity or the first intent:
receiving a confidence level corresponding to the first parsed query response from the AI engine circuitry;
determining that the confidence level does not exceed a confidence threshold level;
communicating a confirmation query to the user device, the confirmation query requesting confirmation that the first query corresponded to the at least one of the first intent and the first entity; and
receiving a confirmation query response from the user device.

9. The method of claim 1, further comprising:
receiving a location of the user device;
determining a customer sales account located geographically closest to the location of the user device;
communicating a geographically contextual query to the user device regarding the customer sales account;
receiving a positive geographically contextual response from the user device; and
setting a current query context to include the customer sales account.

10. The method of claim 1, further comprising:
communicating, by the query processing hardware system, a feedback query to the user device requesting for feedback as to helpfulness of a previous response;
receiving a positive feedback query response from the user device;
logging the positive feedback query response as corresponding to the previous response and a corresponding previous query; and
retraining the pre-trained natural language processing model using the positive feedback query response, the previous response, and the corresponding previous query.

11. A system comprising:
a non-transitory memory storing instructions executable to process a query; and
a processor configured to execute the instructions and to:
receive a first query from a user device;
communicate the first query to artificial intelligence (AI) engine circuitry, wherein the AI engine circuitry executes a pre-trained natural language processing model on the first query, the pre-trained natural language processing model having been trained with a plurality of terminologies and a plurality of primary queries;
receive, from the AI engine circuitry, a first parsed query response, the first parsed query response including at least one of a first intent in the first query or a first entity in the first query;
determine a first application of a plurality of applications associated with the at least one of the first entity or the first intent based on a plurality of decision trees and a plurality of mappings, wherein the plurality of decision trees provides pre-programmed actions responsive to the at least one of the first entity or the first intent, and the plurality of mappings maps the at least one of the first entity or the first intent to the first application;
determine a first application query associated with the at least one of the first entity or the first intent based on the plurality of decision trees and the plurality of mappings, wherein the plurality of mappings maps the at least one of the first entity or the first intent to the first application query;
communicate the first application query to the first application;
receive first result information from the first application responsive to the first application query;
communicate the first result information to the user device;
receive a second query from the user device, wherein the second query is subsequent to the first query and a context of the second query is selected from the first result information;
communicate the second query to the AI engine circuitry;
receive, from the AI engine circuitry, a second parsed query response, the second parsed query response including a second intent in the second query;
determine that an action corresponding to the second intent requires a corresponding entity field;
determine that the second parsed query response did not include a second entity;
when it is determined that the second parsed query response did not include the second entity, review the first query to determine a first context of the first query and use the determined first context as a current context of the second query, wherein the first context includes the first entity;
determine a second application associated with the second intent and the first entity;
determine a second application query associated with the second intent and the first entity;
communicate the second application query to the second application;
receive second result information from the second application responsive to the second application query, wherein the second application provides the second result information that is more detailed than the first result information provided by the first application; and
communicate the second result information to the user device.

12. The system of claim 11, wherein the processor is configured to cause user interface circuitry to:
provide a dynamic user interface to the user device, the dynamic user interface including a query entry element;
receive the first query from the user device via the dynamic user interface;
generate a first graphical element representing the first result information; and
provide the first graphical element to the user device via the dynamic user interface.

13. The system of claim 11, wherein the processor is further configured to:
determine a first actionable insight based on the first result information, the first actionable insight corresponding to the first entity;
communicate the first actionable insight to the user device;

receiving a positive actionable insight response from the user device;
determine a second application associated with the first entity and the first actionable insight;
determine a second application query associated with the first entity and the first actionable insight;
communicate the second application query to the second application;
receive second result information from the second application responsive to the second application query; and
communicate the second result information to the user device.

14. The system of claim 11, wherein the processor is configured to cause the AI engine circuitry to:
receive the first query from the processor;
process the first query with a pre-trained natural language processing model to parse the first query into the first parsed query response including the at least one of the first intent or the first entity;
determine a first confidence level corresponding to the first parsed query response; and
communicate the first parsed query response and the first confidence level to the processor.

15. The system of claim 11, wherein the processor is configured to cause the AI engine circuitry to:
train a natural language processing model with training data to generate the pre-trained natural language processing model, the training data comprising:
a plurality of terminologies and corresponding intents,
a plurality of primary queries and corresponding intents, and
a plurality of conversation flows.

16. The system of claim 11, wherein the processor is further configured to;
receive a location of the user device;
determine a customer sales account located geographically closest to the location of the user device;
communicate a geographically contextual query to the user device regarding the customer sales account;
receive a positive geographically contextual response from the user device; and
set a current query context to include the customer sales account.

17. A method comprising:
in artificial intelligence (AI) engine circuitry:
training a natural language processing model with training data to generate a pre-trained natural language processing model, the training data comprising:
a plurality of terminologies and corresponding intents,
a plurality of primary queries and corresponding intents, and
a plurality of conversation flows;
receiving a first query from query processing hardware;
receiving a second query from the query processing hardware, wherein the second query is subsequent to the first query and a context of the second query is selected from first result information;
processing the first query with the pre-trained natural language processing model to parse the first query into a first parsed query response including at least one of a first intent of the first query or a first entity in the first query;
processing the second query with the pre-trained natural language processing model to parse the second query into a second parsed query response including a second intent in the second query; and
communicating the first parsed query response and the second parsed query response to the query processing hardware;
in the query processing hardware:
receiving the first parsed query response;
determining a first application query associated with the at least one of the first entity or the first intent based on a plurality of decision trees and a plurality of mappings, wherein the plurality of decision trees provides pre-programmed actions responsive to the at least one of the first entity or the first intent, and the plurality of mappings maps the at least one of the first entity or the first intent to the first application query;
querying a first application with the first application query;
receiving the first result information from the first application;
receiving the second parsed query response;
determining that an action corresponding to the second intent requires a corresponding entity field;
determining that the second parsed query response did not include a second entity;
when it is determined that the second parsed query response did not include the second entity, reviewing the first query to determine a first context of the first query and using the determined first context as a current context of the second query, wherein the first context includes the first entity;
determining a second application associated with the second intent and the first entity;
determining a second application query associated with the second intent and the first entity;
communicating the second application query to the second application;
receiving second result information from the second application responsive to the second application query, wherein the second application provides the second result information that is more detailed than the first result information provided by the first application; and
communicating the second result information to the query processing hardware.

18. The method of claim 17, further comprising:
in user interface circuitry:
providing a dynamic user interface to a user device, the dynamic user interface including a query entry element;
receiving the first query from the user device via the dynamic user interface;
generating a first graphical element representing the first result information; and
providing the first graphical element to the user device via the dynamic user interface.

19. The method of claim 17, further comprising:
in the query processing hardware:
receiving a location of a user device;
determining a customer sales account located geographically closest to the location of the user device;
communicating a geographically contextual query to the user device regarding the customer sales account;
receiving a positive geographically contextual response from the user device; and
setting a current query context to include the customer sales account.

20. The method of claim 17, further comprising:
in the query processing hardware:
- communicating a feedback query to the user device requesting for feedback as to helpfulness of a previous response;
- receiving a positive feedback query response from a user device;
- logging the positive feedback query response as corresponding to the previous response and a corresponding previous query; and
- retraining the pre-trained natural language processing model using the positive feedback query response, the previous response, and the corresponding previous query.

* * * * *